US006304973B1

(12) United States Patent
Williams

(10) Patent No.: US 6,304,973 B1
(45) Date of Patent: Oct. 16, 2001

(54) MULTI-LEVEL SECURITY NETWORK SYSTEM

(75) Inventor: Timothy C. Williams, Chantilly, VA (US)

(73) Assignee: Cryptek Secure Communications, LLC, Chantilly, VA (US)

( * ) Notice: Subject to any disclaimer, the term of this patent is extended or adjusted under 35 U.S.C. 154(b) by 0 days.

(21) Appl. No.: 09/129,879

(22) Filed: Aug. 6, 1998

(51) Int. Cl.[7] .................................................... G06F 12/14

(52) U.S. Cl. ......................... 713/201; 713/153; 713/192; 713/200

(58) Field of Search .................................... 713/151, 153, 713/154, 200–202, 192; 711/213–215; 710/52, 129; 709/213–215; 235/375–386, 435, 487

(56) References Cited

U.S. PATENT DOCUMENTS

| | | | |
|---|---|---|---|
| 4,797,928 * | 1/1989 | Dykes | 380/49 |
| 4,845,717 * | 7/1989 | Iijima | 371/60 |
| 4,987,595 * | 1/1991 | Marino, Jr. et al. | 713/164 |
| 5,075,884 | 12/1991 | Sherman et al. . | |
| 5,155,829 * | 10/1992 | Koo | 395/425 |
| 5,263,147 * | 11/1993 | Francisco et al. | 711/164 |
| 5,297,255 * | 3/1994 | Hamanaka et al. | 712/74 |
| 5,459,851 * | 10/1995 | Nakajima et al. | 395/476 |
| 5,548,721 * | 8/1996 | Denslow | 395/187.01 |
| 5,577,209 | 11/1996 | Boyle et al. . | |
| 5,602,918 | 2/1997 | Chen et al. . | |
| 5,603,031 | 2/1997 | White et al. . | |
| 5,623,601 | 4/1997 | Vu . | |
| 5,638,448 | 6/1997 | Nguyen . | |
| 5,680,452 | 10/1997 | Shanton . | |
| 5,689,566 | 11/1997 | Nguyen . | |
| 5,692,124 | 11/1997 | Holden et al. . | |
| 5,699,513 | 12/1997 | Feigen et al. . | |
| 5,701,343 | 12/1997 | Takashima et al. . | |
| 5,724,027 | 3/1998 | Shipman et al. . | |
| 5,765,036 * | 6/1998 | Lim | 711/147 |
| 5,787,310 * | 7/1998 | Shimizu et al. | 710/42 |
| 5,802,178 * | 9/1998 | Holden et al. | 380/49 |
| 5,818,939 * | 10/1998 | Davis | 380/49 |
| 5,822,435 * | 10/1998 | Boebert et al. | 380/49 |
| 5,822,784 * | 10/1998 | Garney | 711/208 |
| 5,860,021 * | 1/1999 | Klingman | 712/32 |
| 6,081,848 * | 6/2000 | Grun et al. | 710/1 |

OTHER PUBLICATIONS

Network Security Laboratories, Inc., "Technical Overview of Cryptek's DiamondTEK Ultra," http://www.cryptek.com/Dtekultrd.html [internet], Feb. 1998.*

DiamondTEK Brochure On–Line, http://www.cryptek.com/diamond.html [internet], Feb. 2000.*

DiamondNIC Trademark information, http://trademarks.uspto.gov [internet].*

(List continued on next page.)

*Primary Examiner*—Albert Decady
*Assistant Examiner*—Stephen Kabakoff
(74) *Attorney, Agent, or Firm*—Jacobson Holman, PLLC

(57) ABSTRACT

A network prevents unauthorized users from gaining access to confidential information. The network has various workstations and servers connected by a common medium and through a router to the Internet. The network has two major components, a Network Security Center (NSC) and security network interface cards or devices. The NSC is an administrative workstation through which the network security officer manages the network as a whole as well as the individual security devices. The security devices are interposed, between each of workstation, including the NSC, and the common medium and operate at a network layer (layer 3) of the protocol hierarchy. The network allows trusted users to access outside information, including the Internet, while stopping outside attackers at their point of entry. At the same time, the network limits an unauthorized insider to information defined in their particular security profile. The user may select which virtual network to access at any given time. The result is trusted access to multiple secure Virtual Private Networks (VPN), all from a single desktop machine.

22 Claims, 14 Drawing Sheets

OTHER PUBLICATIONS

LAN Magazine 8/97, http://www.hackzone.ru/nsp/info/misc/osp/o_r_books.html [internet], Aug. 1997.*

General Kinetics Inc., VSLAN 6.0 VSLANE 6.0 Network Component MDIA, Jul. 20, 1995.

Verdix Coporation, VSLAN 5.0 Network Component MDIA, Aug. 22, 1990.

Department of Defense Trusted Computer System Evaluation Criteria, Dec. 1985, DOD 5200.28–STD.

Trused Network Interpretation of the TCSEC, NCSC–TG–005, Library No. S228, 526, Version 1, Jul. 31, 1987.

* cited by examiner

FIG. 5
* CIPSO LABELING
VSLAN Header
IP Header
IP Data
CIPSO LABEL
After
Enet Header
IP Header
IP Data
* HOST TO HOST COMMUNICATION
Travel log
Enet Header
New IP Header
AH Header
ESP Header
Old IP Header
IP Data
Transport
Enet Header
IP Header
AH Header
ESP Header
IP Data
* CONTROL COMMUNICATION
VSLAN Header
LLC Header
NSC Message
After
Enet Header
IP Header
AH Header
ESP Header
LLC Header
NSC Message

MULTI-LEVEL SECURITY NETWORK SYSTEM

FIELD OF THE INVENTION

The present invention relates to a multi-level security network system. More particularly, the present invention relates to a secure communication between hosts using a network that implements a security policy, and especially a network allowing multiple levels of information to coexist on a network system.

BACKGROUND OF THE INVENTION

The National Security Agency (NSA) has set forth specific definitions and requirements that establish various levels of security in computer and network systems. These basic definitions are set forth in "Trusted Computer System Evaluation Criteria," Department of Defense, 1985 (TCSEC) and "Trusted Network Interpretation of the Trusted computer System Evaluation Criteria," National Computer Security Center, 1987 (TNI). These documents define the requirements for systems to be evaluated in one of six hierarchical ratings: C1, C2, B1, B2, B3, and A1, with C1 being the least secure and A1 the most secure.

Division B, that is, ratings B1, B2, and B3, introduces the requirements for multi-level secure (MLS) systems. The term "multi-level security" refers to a system in which two or more classification levels of information are processed simultaneously, and not all users are cleared for all levels of information present. This same concept was applied during the 1980's to networked systems, at which time the phrase MLS network was generally used to refer to a network that was capable of simultaneously transmitting data at multiple security levels when some hosts or users were not cleared for all levels of data.

In order for an MLS network to qualify as a B-level secure network, it must provide at least the following five security functions: (1) access control, (2) object reuse, (3) labeling, (4) identification and authentication (I&A), and (5) auditing. Open Systems Interconnection (OSI) sets forth industry standard definition of seven layers of network connection: (1) physical, (2) data link, (3) network, (4) transport, (5) session, (6) presentation, and (7) application.

The first criteria, "access control," is concerned with the enforcement of rules (security policy) by which active subjects (e.g., processes, hosts) access passive objects (for example, files, memory, and devices). In a network system, operating at the OSI network layer of the protocol hierarchy, access control is concerned with the access of hosts to network packets. Rule-based Mandatory Access Control (MAC) is concerned with preventing each host from transmitting or receiving data at the wrong level. Discretionary Access Control (DAC), on the other hand, is concerned with ensuring that a host computer can only establish authorized connections to other hosts.

The second criteria, "object reuse" is concerned with preventing inadvertent release of residual data, typically in unused fields or at the end of a packet buffer. "Labeling" of each packet is necessary in a distributed system to convey the sensitivity of data to the various elements of the network. "Identification and Authentication" (I&A) is concerned with establishing individual accountability for authorized users. "Audit" is concerned with recording information about the use of the network's security mechanisms, to further support the requirement of user accountability.

In addition to these five basic requirements, a secure network should also provide two other capabilities, communications secrecy and communications integrity. These additional requirements support the secure transfer of MLS labeling and control information in an open environment, such as the Internet. Communications secrecy is provided by appropriate use of encryption to transform user data and control information so that it is unintelligible to wiretappers. Encryption is a process that scrambles or transforms sensitive data within messages (either an entire message, or part of a message) to make them unreadable to any recipient who does not know a secret string of characters, called a key.

Communications integrity, on the other hand, is concerned with detecting modification of data, such as security labels, and user data, as it traverses the network. Packet integrity has also been accomplished by calculating cryptographic checksums of packet headers and packet data. The receiving node can straightforwardly detect message modification to a high degree of probability by recalculating the cryptographic checksum on the received data, and comparing it to the received checksum.

The current approaches to MLS networking include Verdix VSLAN (which has subsequently changed to GKI, then to Cryptek Secure Communications VSLAN), Boeing MLS LAN and ITT networks.

The Verdix Secure Local Area Network (VSLAN) product was developed by Verdix Corporation in the 1980s. VSLAN was the first network product evaluated by the TNI criteria and the first commercial network product to provide MLS security. VSLAN is the only commercial network product available with a B2 rating. However, VSLAN operates at the link layer (layer 2) of the protocol stack and, thus, its security mechanisms are limited to the scope of a local area network. While VSLAN uses Data Encryption Standard (DES) for communications integrity, it cannot be used on an open network because DES is not sufficiently strong to protect classified data.

The Boeing MLS LAN has received an A1 security rating with respect to the TNI. It does not provide any encryption, but relies on physical protection of the medium to protect data in transit.

The ITT network security is described in U.S. Pat. No. 5,577,209 to Boyle et al. ("Boyle"). Boyle uses cryptographic sealing techniques to support MLS labeling and mediation. The approach operates at the session layer (layer 5) of the OSI protocol reference model. Boyle, however, does not provide encryption of data for purposes of secrecy. Consequently, classified data could be accessed by passive wiretapping or by use of readily available tools, such as tcpdump running on any host in any of the intermediate networks.

Most protocol architectures do not have a protocol implementation that uses a distinct session-layer protocol. Rather, for protocols commonly used on the Internet, application programs (layer 7) interface directly to the transport layer (layer 4) of the protocol hierarchy. For these two reasons, Boyle is not very useful with real classified data on real networks, such as the Internet.

Over the past 15 years, computer security and network security have progressed on separate tracks. Computer security has generally been concerned with the evaluation of standalone computer systems, without networking, at a time when the Internet was exploding. With the exception of a few TNI-evaluated products, network security has concentrated on the use of cryptography (particularly public key cryptography) and firewalls. Cryptography has been used to provide secrecy and integrity, largely without regard for the security of the communicating systems.

Various methods and devices have been used to enhance network security, including firewalls, identification and authentication (I&A), intrusion detectors, and virtual private networks (VPN).

Firewalls have been used to protect an organization's internal resources from the external Internet by passing certain protocols (e.g., email, name services) into the protection perimeter, but filtering out all protocols not explicitly listed. The firewalls attempt to isolate a company's intranetwork from the remainder of the Internet. Firewalls provide proxy servers that stand between the external network and internal resources and that pre-validate external requests.

However, firewalls are only intended to protect internal resources from outsiders. As a result, firewalls offer no protection against an internal attack upon those same resources. Firewalls are generally subject to impersonation, in which an intruder's host is programmed to use an IP address of one of the network computers, or an attacker may know the password of one of the trusted users. Firewalls are also subject to session stealing, in which the intruder takes over an authorized session, together with all access modes established for the authorized user.

Firewalls may provide an IP tunneling capability to provide encrypted channel across the Internet to another part of the company's intranetwork. However, a major problem with firewalls is that once an unauthorized user is "in" to a host of the internal network, it is possible to use that host as a point for attacking other hosts within that network.

I&A devices generally involve the use of passwords for a user on one host to gain access across a network to another host. I&A may also be implemented by the use of a Personal Identification Number (PIN) and device to authenticate the user. The I&A device may be hardware using smart card technology that either takes a challenge and calculates a response or uses some clock-based synchronization to ensure that the I&A data passed across the network is unique from one access attempt to another. I&A may also be implemented in software.

However, the use of I&A mechanisms does not address mediation (MAC, DAC) in any way, nor does it address the use of encryption or packet integrity on a stream of packets from one host to another. Furthermore, the risks of reusing a password across a network are obvious, given the availability of public domain software to grab packets as they traverse internal networks. Once an attacker (whether inside or outside the network) is able to send packets to your host, there are other attacks, such as routing via your host to another host, or sending packets to unprotected TCP/UDP ports, that could jeopardize the operation of any host on the network.

An intrusion detector generally involves the use of a "sniffer," such as tcpdump or hardware that snoops packets on the internal network, that attempts to detect and react to malicious behavior. However, intrusion detectors only provide detection, and not prevention. That is, the detectors cannot prevent an intrusion, but only detect that an intrusion has occurred. Intrusion detectors also do not provide a way for mediating the flow of packets, protecting packet secrecy, or protecting packet integrity.

Virtual private networks (VPNs) are implemented by firewalls with encryption between different sites of a network or local area network (LAN). Some VPNs provide software-based encryption that runs on the individual host computers of the network. Generally, a VPN may be defined as a private network that exists within a larger, open network and uses methods (such as encryption) to make the network private.

Site-Level VPNs have the classic problems of firewalls. That is, they do not protect internal communications, and are susceptible to session stealing and sniffing on local and remote networks. An encrypted path between two sites may shut out an external attacker, but an internal attacker on the LAN has free rein to attack any host in that network, as well as any host in any of the other related LAN sites.

Software-based host level VPNs provide a driver that sits between the ethernet driver and the TCP/IP protocol stack. These VPNs offer some of the distributed advantages of having a firewall-at-each-host architecture, but do not have an architectural basis for protecting the hosts. The software VPN can be bypassed, for instance, if an application process on the host can communicate directly with the NIC driver via the OS on that host, instead of using the software VPN interface. Software VPNs may also be disabled or modified by processes running with privilege (e.g., the UNIX root user or its equivalent on NT boxes). It relies on the host OS for protection, and not all hosts provide equivalent protections, so a node with a weak OS could be used as a location to launch attacks against other hosts.

SUMMARY OF THE INVENTION

Therefore, it is a primary object of the present invention to overcome the limitations of the conventional security mechanisms. It is a further object of the invention to provide a secure network in which the security mechanisms are at layer 3 of protocol hierarchy. It is another object of the invention to provide a centralized administration of a layer 3 secure network that may be distributed over the Internet. It is another object of the invention to provide a security device that prevents unauthorized third parties from gaining access to a host. It is another object of the invention to provide a multi-level secure network having a security device coupled between each host and the network medium.

In accordance with these and other objectives, the secure network of the present invention, having a commercial name DiamondTEK Ultra, provides a unique implementation of cryptographic technology with high-assurance policy-based enforcement of packet flow. The network prevents unauthorized users from gaining access to sensitive information. Although the network of the present invention has not yet completed evaluation by the NSA, it is designed to satisfy all of the B2 criteria.

The network generally comprises various host computers (such as PCs, workstations, or servers) connected by a common medium. Routers may be used to connect Local Area Networks to public networks, such as the Internet. The network has two major components, a Network Security Center (NSC) and security network interface cards or "security devices."

The NSC is an administrative workstation through which a network security officer manages the security aspects of the system and implemented by the individual security devices. The NSC is responsible for setting up authentication materials and for authorizing individual peer-to-peer and client server associations. In addition, since this is a Multi-Level Secure network, the NSC is responsible for defining the security levels and categories of information permitted on the network and the labeling used by each host.

The security devices are interposed between each host, including the NSC, and the common medium. The security devices enable a host to communicate across the network. Unlike other network security solutions, the security device is designed as a self-contained circuit board that is directly integrated into the hardware of the host system. The architecture of the security device is readily integrated into a variety of hardware environments.

The security devices authenticate principals responsible for host computers that connect to the network. Through use of the security devices and the NSC, the network allows trusted users to access outside information, including the Internet, while stopping outside attackers at their point of entry. At the same time, the network limits an insider to information defined in their particular security profile. The user may select which logical network to access at any given time. The result is trusted access to multiple secure Virtual Private Networks (VPN), all from a, single desktop machine.

The present network simultaneously enforces two independent and complementary types of access control rules: discretionary access control (DAC) and mandatory access control (MAC).

The network further ensures confidentiality and integrity of host-to-host communications by the use of encryption mechanisms. Cryptography provides the underlying secrecy and integrity of communications required for the network to be able to enforce a unique policy when operating over an open backbone network. Various types of cryptography are available, including DES, and Triple-DES for commercial and financial applications, and high-grade Type 1 encryption for classified applications. The network ensures that messages cannot be modified by an unauthorized user, or attacker, through the use of message digests.

The features of the network overcome the problems associated with traditional I&A devices, intrusion detectors, firewalls and VPNs, as well as with previous MLS networks (such as VSLAN, Boeing MLS LAN and the ITT network). The security device is a separate hardware board having a separate CPU, memory, network interface and bus architecture from the application processes on the host. A dual-ported RAM architecture guarantees that no malicious host process can tamper with the internal configuration of the security device. All network accesses must go through a security device, which implement security mechanisms for each and every access attempt. The security devices cannot be bypassed since there is no other path to or from the network.

The network extends the mediation and cyptographic protection offered by a firewall (with its mediation and its cryptographic protection) to the network interface of each individual host computer. This may still permit a malicious user on a particular Bethesda machine to use a permitted association to a host in Tampa to attack that machine, but the network architecture significantly restricts the ability of the attacker to access other hosts. Further, the auditing by the network involved, transparently forwarded to a central collection site at the NSC, can be used to provide accountability, which makes discovery for such attacks more certain.

The network provides hardware based mediation (MAC and DAC) at each host, and provides cryptographic protection (secrecy, integrity) on all host-to-host associations.

As used herein, the term "policy" refers to the control of sensitive and potentially classified data according to the rules of the system as set by the system controller. For example, a host operating at a security level of Secret may transfer data to another Secret host, but is prohibited from sending data to a host operating at a lower classification. Similarly, hosts operating at higher classifications or with additional non-hierarchical categories are prohibited from sending messages to the Secret host.

DETAILED DESCRIPTION OF THE PREFERRED EMBODIMENTS

Figure 1:
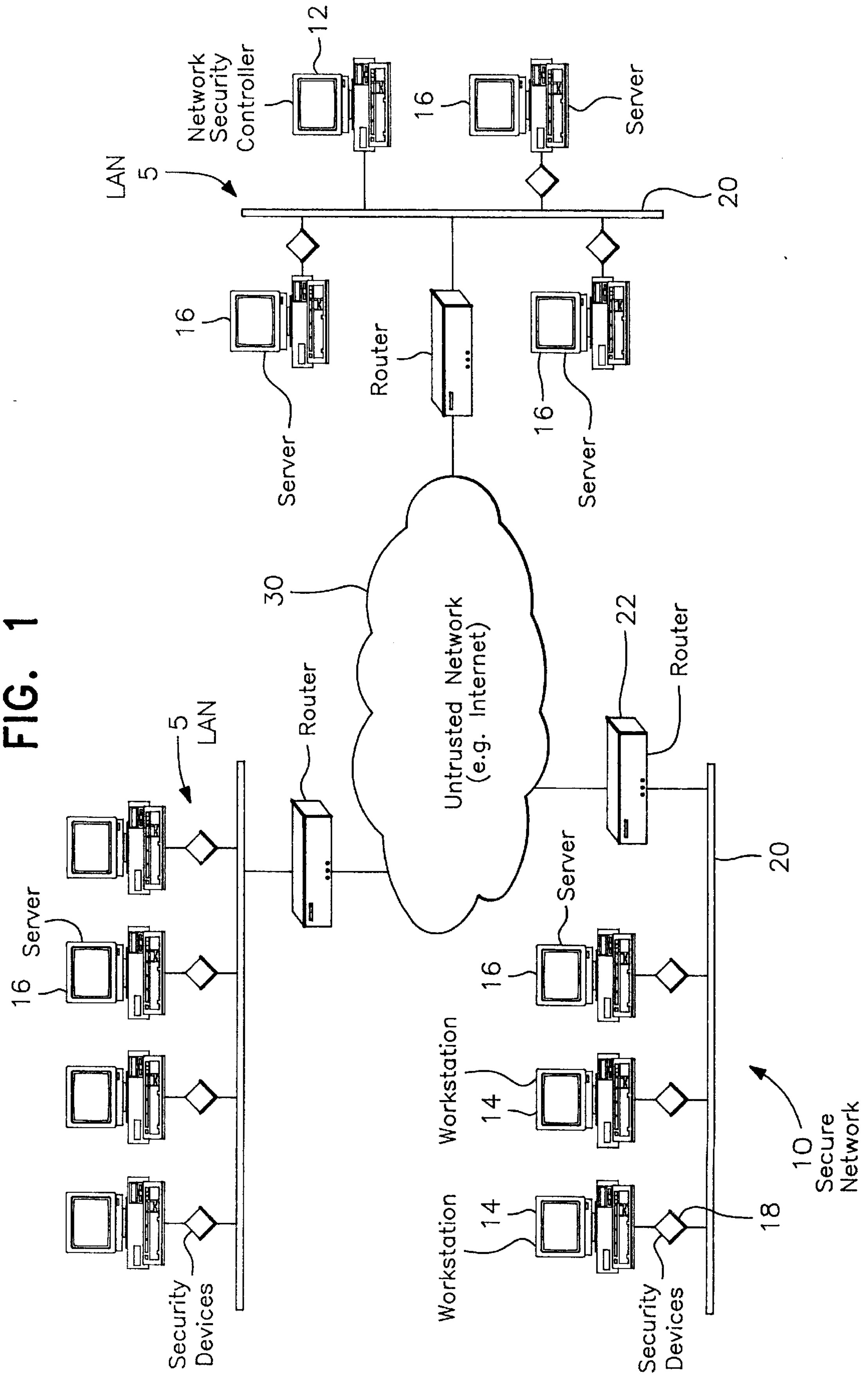
FIGS. 1–3 show various instances of the secure network having a security device in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
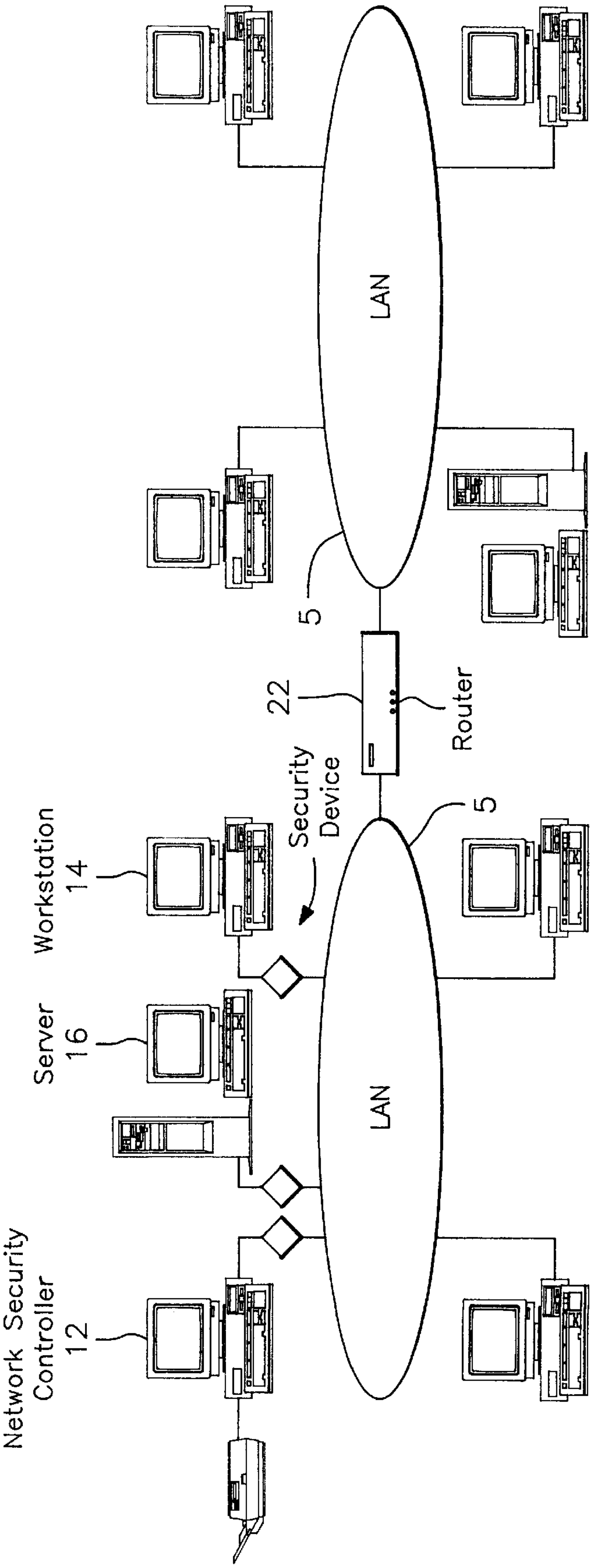
Figure 3:
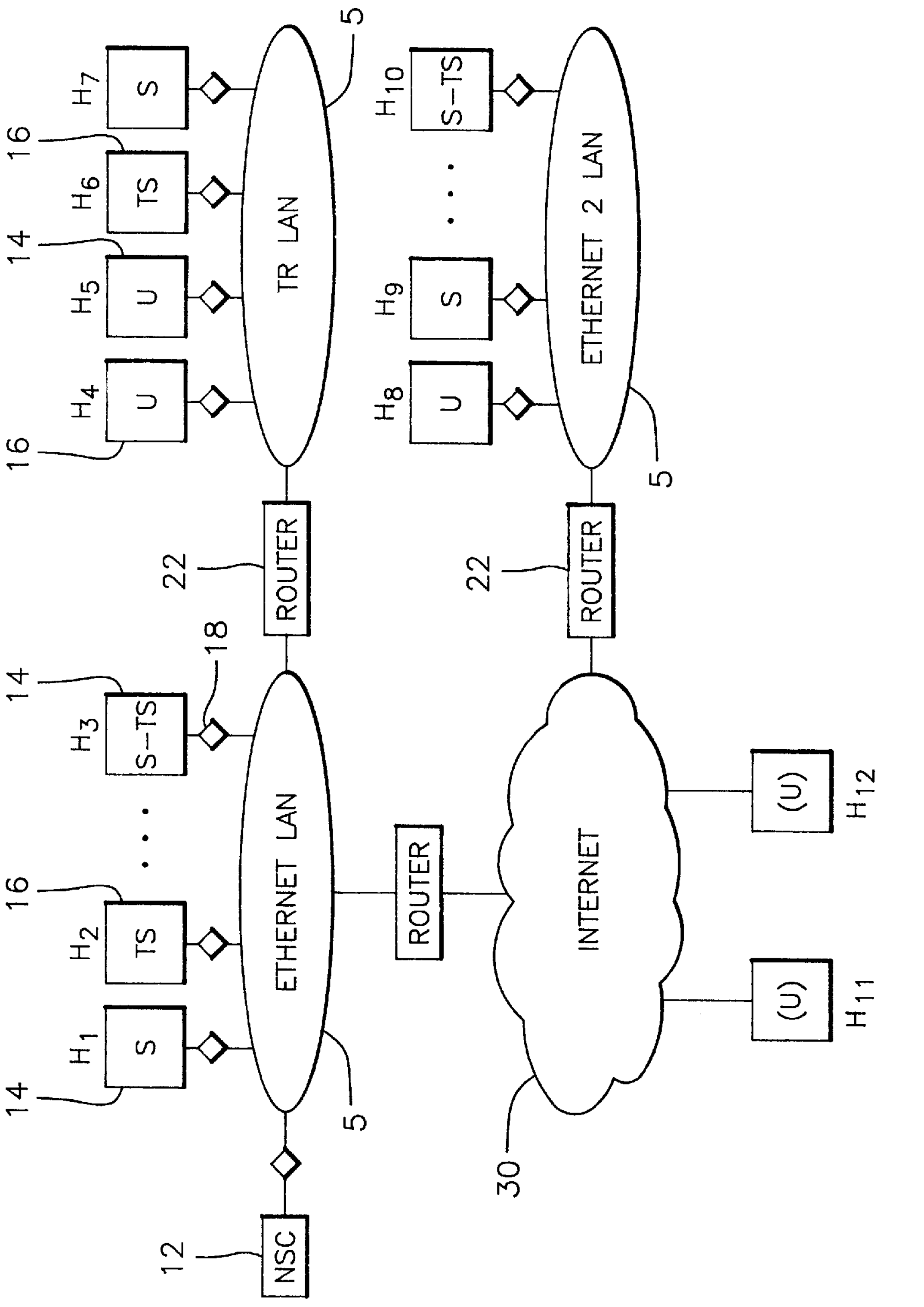

Turning to the drawings, FIGS. 1–3 show various embodiments of a security network 10 having a dedicated Network Security Controller (NSC) 12, workstations 14 and servers 16. The NSC 12 permits a Security Officer to configure and audit the operation of the secure network 10. The network 10 also has security devices 18, having the commercial name DiamondNIC, installed between each host (workstation 14 or server 16) and the local area network medium 20 to form a Local Area Network (LAN) 5. The various LANs 5 are connected to an untrusted backbone net 30 by a router 22.

The security device 18 is preferably a Network Interface Card (NIC) that easily replaces a standard NIC card for nodes that contain or need access to sensitive information. The security device is a self-contained circuit board that is directly integrated into the hardware of the host system.

Thus, the security cards 18 operate at the network layer (layer 3) of the protocol stack and provide encrypted, controlled communications from one host (IP address, TCP/UDP port) to another. Because the security mechanisms operate at layer 3, the security mechanisms pertain to the entire Internet address space. Further, the choice of LAN or WAN medium is not relevant to the security provided by the system.

Each security device 18 enforces a mandatory access control (MAC) policy, as well as discretionary access control (DAC) policy, on the flow of packets to and from that host 14, 16. It ensures labeling of all data packets with a hierarchical security level and a set of non-hierarchical security categories appropriate for the local hosts The DiamondNIC security device 18 provides user identification and authentication (I&A) via a card reader and, keypad (not shown) attached to the device 18. Auditing is provided by the use of embedded firmware within the security device, with audit data directed to the NSC 12 for archival. Finally, the security device 18 uses encryption to provide secrecy and communications integrity on all selected connections.

Hosts that are installed with the DiamondNIC security devices 18 may communicate with like hosts on the internetwork, as permitted by profiles, operating at security levels loaded from the NSC 12. Host software, even malicious host software, cannot bypass the security mechanisms (mediation, auditing, encryption) provided by the security device 18 because the security mechanisms are embedded within the device 18 itself and all network communications must pass through the security device 18 in order to access the network.

The network 10 provides the same capabilities as firewalls, with several additional advantages. The network 10 extends the firewall concept to each individual host in the intranet. Thus, the policy enforced for each host is the policy required for that host, not a one-size-fits-all policy imposed by a single firewall. The network 10 also provides centralized network control, which permits hosts to be switched from one security profile to another, without risk that information may leak across security levels. This network security architecture makes an NSA B2 security rating possible.

NETWORK SECURITY THREAT MODEL

To be effective, security mechanisms should be derived from the security threats that affect an organization. All security threats generally are concerned with the unauthorized disclosure of sensitive information or the modification of data. The primary threats for an organization processing sensitive data within a networked system, and particularly a networked system interconnected with the Internet, are disclosure, downgrading, passive wiretapping, active wiretapping, downloaded software, and covert channels.

In a classified environment, the threat of disclosure includes the ability to read data that is classified above the user's current level. In a classified environment, the threat of downgrading includes writing data to a lower classification than the user's current level. These threats are addressed by appropriate use of multi-level security (MLS) technology.

Passive wiretapping includes monitoring at intermediate sites, using tools such as tcpdump, as well as attaching devices to monitor the communications medium. The network counters the threat of passive wiretapping by appropriate use of encryption.

Active wiretapping, also known as message stream modification, includes the modification of selected data (e.g., monetary amounts) within a packet, insertion of new packets into the data stream, playback of packets, and deletion of selected packets. Network control, as well as user data connections, can be attacked. This is countered by appropriate use of cryptographic checksums.

Cryptographic checksums are used to calculate an error detection code on a block of data, using encryption and a secret key. If two communicating hosts each calculate the same code, then there is a very high probability that the data was not modified in transit.

The threat of downloaded software includes viruses, malicious programs, Java code, and other software that can be downloaded by a trusted host from potentially malicious hosts. This is addressed in the present network by ensuring that hosts interact only with other trusted hosts operating at the same classification.

A covert channel exists when a high-level process manipulates a shared resource or modulates the rate at which data is sent, to signal data to a lower-level process. There are two types of covert channels, timing and storage. Covert channels, however, are much less a problem in a network environment than on a standalone computer, but still must be addressed in MLS systems. Secure networks cannot entirely stop covert channels between communicating hosts.

ARCHITECTURE

The network 10 architecture essentially comprises a specialized NSC 12 host dedicated to configuring and auditing the secure network and a DiamondNIC network security device 18 installed between each host computer and the network medium 20.

Hosts, Users, and Principal

The network over which the security device 18 communicates actually enforces security with respect to network hosts. A principal is an individual that authorizes one or more users to access the network from a given host system, subject to a certain security profile (mandatory and discretionary access control rules). The network can be configured by the network security officer such that a single host may have more than one principal. Hence, each principal must complete an identification and authentication (I&A) procedure before the host is permitted to communicate over the network.

When the I&A procedure has been completed, the security device 18 communicates with the NSC and downloads the principal's operational profile—the combination of association lists (for discretionary access control) and security windows (for mandatory access control)—from the NSC. From that point onward, the security device securely transmits and receives data over the network independently and transparently, relying upon its own CPU to avoid depriving the host of processing bandwidth. The bandwidth may be needed to offload processing, such as encryption. More importantly, however, independent transmission by the security device also prevents the host software from being able to bypass the security mechanisms.

The security device will only send and receive messages if the communication has been specifically authorized in the operational profile assigned by the network security officer. Encryption keys are generated and exchanged as necessary. The VPN is a collection of potentially communicating hosts, such as A, B, C, D and E. Each individual pair has an association, and the virtual private network (VPN) is the collection of all possible associations (e.g., A-B, A-C, A-D, A-E, B-A, B-C, etc.). Each pair of communicating security devices may be said to establish a transparent VPN, whereby every message is automatically encrypted before transmission and decrypted after arrival at its intended destination.

The network security officer may empower each user to access a variety of hosts with different degrees of privilege. For instance, suppose that a certain user is authorized to access the network not only from his desktop PC, but also from a workstation housed within a physically secure laboratory protected by a cipher lock. The NSO can define two operational profiles for the user, thought of as different roles, to give that user more privileges when accessing the network from the physically secure workstation than when connected from the unprotected desktop PC.

In addition, a person may be a principal at different devices with different profiles (that is, security levels and associations) defined for each device. A principal can also be enabled to operate the security device in a bypass or non-secured mode and thereby network non-sensitive data with other hosts that are not individually equipped with a security device.

Conceptual Network Architecture

Figure 4:
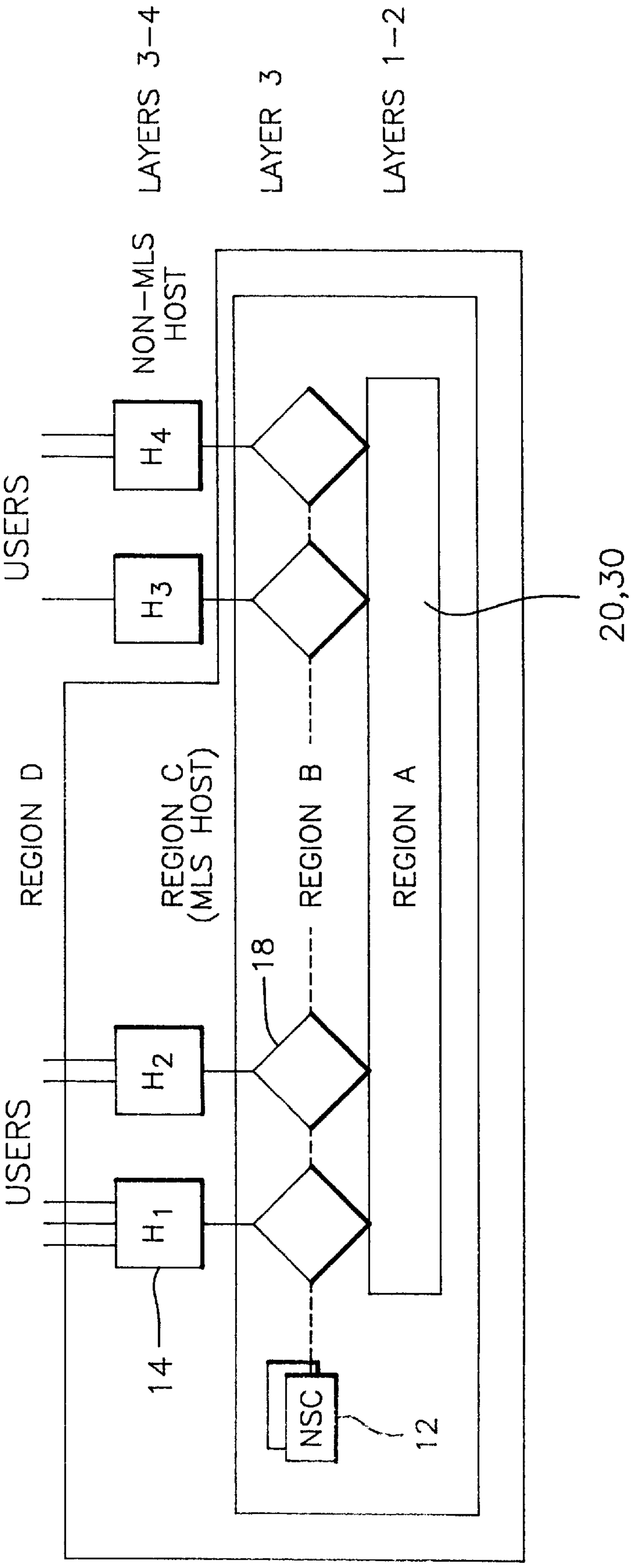
FIG. 4 is a diagram of the conceptual network architecture.

FIG. 4 depicts the architecture of the system with respect to the trust required in its constituent parts and the OSI layers in the protocol hierarchy where these functions reside. Region A includes the physical layer communications links, link layer protocols, repeaters, bridges, and intermediate routing hosts. The hardware and software in this region need not be trusted or physically protected, because of end-to-end mechanisms implemented in Region B.

Region B consists of the trusted devices, where each security device 18 is represented by a diamond-shaped object. The dashed lines indicate that control and auditing of the security devices 18 is implemented wholly within Region B, by the NSC 12. The devices 18 operate within layer 3 of the protocol hierarchy and provide a cryptographic foundation that assures communications secrecy and communications integrity. Any suited cryptographic method may be used, including the Data Encryption Standard (DES) and Triple-DES for commercial and financial applications and ranging to high-grade Type 1 algorithms for government and military applications.

Because the security devices 18 provide communications secrecy appropriate for the information being carried on the network, there is no need to physically or procedurally protect the communications medium in Region A. Any information intercepted by a wiretapper or intermediate host will be unintelligible. In addition, the security devices 18 provide communications integrity mechanisms appropriate for the information being carried on the network. Communications integrity mechanisms include, but are not limited to, keyed message digests (MDS), secure host algorithm (SHA) and message authentication code. Thus, any attempts to modify the host data (IP data field or header) will be detected by the recipient security device 18.

Regions C and D include host computers 14 (either workstations 14 or servers 16), the TCP/IP protocol stack, application programs, and users. The Internet Protocol (IP) runs at layer 3, the Transmission Control Protocol (TCP) and User Datagram Protocol (UDP) run at the transport layer (layer 4) and application protocol (e.g., Telnet, File Transfer Protocol) clients and servers run at layer 7 of the protocol hierarchy.

The distinction between Region C and Region D is that hosts in Region C are trusted MLS computers that are capable of simultaneously processing data at multiple security levels, while hosts in Region D are not capable of simultaneously processing data at multiple security levels. Hosts in Region D may be evaluated according to the U.S. Government Trusted Product Evaluation Program (TPEP) or Trusted Technology Assessment Program (TTAP) programs, the upcoming Common Criteria, or less rigorous programs such as Security Proof of Concept Keystone (SPOCK) or the International computer Security Association (ICSA). These hosts may be multi-user or single-user at a time computers, but are capable of operating only at one security level at a time.

Installation and Profiles

The network 10 is typically installed by first installing the NSC 12 in a secure location, readily available to the security officers. The security device 18 adapters are typically installed in the backplanes of the various host computers, and software drivers, associated with the operating system, are installed on the host computers.

After the network 10 is installed and configured, the Security Administrator defines information about the security devices, their principals, and attached hosts. The administrator adds the information for each of the security devices 18 to a database located at the NSC 12. In addition, the administrator programs an authentication card for the principal with the security device information, including the principal's one-time password. The administrator travels to each of the nodes, and reads in the card to install node-specific information onto the board of the security device.

A principal initializes and uses a node by first going to the node and, using the appropriate I&A means, selects a profile and identifies and authenticates himself/herself to the network. For example, this may include inserting the principal's authentication card in the card reader attached to the security device 18.

The principal also selects a usage profile using the push-buttons on the front of the card reader. The principal is able to select only among those profiles entered by the security administrator. There can be up to 100 profiles defined for each principal although, in practical use, most principals will have only a few profiles. The selected profile has associated with it a security window and permitted host-to-host associations.

The NSC 12 sends the appropriate security window and associations for the profile to the security device 18. Once the host initializes the device driver, the host transmits packets to the network. The security device 18 mediates each packet according to the security window and authorized associations, then encrypts the packet using the appropriate traffic key.

When the security device 18 detects an attempted security violation, it sends an audit event to the NSC. If authorized, the principal may switch to a different profile, with a different security window and different associations. This permits a principal to easily change from one usage profile to another, as required, among the set of such profiles authorized for the principal.

However, only one profile (that is, security windows and associations) can be in effect at a given security device at any time. Thus, if a principal change profiles by selecting a different profile, the security device is flushed and all data is reloaded. The principal may or may not have to remove the authentication card. The clearing out of the security device is not known by the principal.

The principal shuts down the security device 18 by removing the card (or logging out) and perhaps powering down the system. Throughout this operation, the security device 18 will only transmit or receive packets in accordance with the established current profile. Hence, the principal's profile is preferably configured to prevent access to both classified and public outside information at the same time.

Accordingly, the network allows trusted users to access outside information, including the Internet, while stopping outside attackers at their point of entry. At the same time, the network limits an insider to information defined in their particular security profile. The network preserves the security effects compartmentalization, while making it easy for authorized users to access the information they need. Unlike static VPN solutions, the network lets the user decide which network to access at any given time.

Integrity and Assurance

The network system ensures both confidentiality and integrity of host-to-host communications by the use of encryption and integrity techniques. Encryption is a process that scrambles sensitive messages to make them unreadable to any recipient who does not know a secret string of characters, called a key.

If the network security officer has authorized two hosts to communicate at a given security level, via the use of principal profiles, the security devices 18 perform a key exchange protocol and generate unique keys known only to that pair of security devices 18. These keys are henceforth used to encrypt all communication between the attached hosts at the chosen security level until one of the hosts either shuts down or disconnects from the network or a defined limit of use has been exceeded.

By having the security device automatically encrypt all messages, security of communication across the network is ensured. The user need not remember complex pass phrases and complete an authentication protocol that could be spoofed by Trojan horse software. In addition, by applying encryption at the network layer, rather than at the application layer, the network accomplishes all authentication, key generation, and key distribution functions transparently and effortlessly. An application programming interface may also be provided by the security device 18 to allow the user to encrypt individual files and directories, as well as messages.

The assignment of unique keys to each pair of hosts at each security level offers two advantages. First, the network preferably incorporates various LANs, such as Ethernet and Token Ring, as well as transmitting packets through the Internet, which potentially allows messages to be intercepted by hosts other than the intended recipient. Encryption guarantees that only authorized target hosts can retrieve the information.

Second, if a key should somehow be stolen unbeknownst to the principals that share the key, only a small subset of the total network traffic is compromised. It is noted, however, that the traffic keys are not known even to the principals. The keys are established by the two communicating security devices, and kept in memory inside the two security devices. So, there's no practical way for someone to steal a key. Yet, if someone is snooping packets on the network, and manages to guess the key, the key would only be valid for traffic from one host, to another host, at a particular level.

Additional security may be provided by intermediate hosts on the Internet, such as Internet Service Providers, that run readily available sniffing tools, such as the UNIX tcpdump program to view all packets matching certain filters defined by the wiretapper.

The network 10 further ensures that messages have not been modified by an attacker through the use of message digests, such as cryptographic checksums. As noted above, a message digest is a number that is calculated from the text of the message and is then transmitted along with the message. When the encrypted information is received, the digest calculation is performed anew (for the encrypted data) at the receiving host and compared to the received value of the digest. If the transmitted value and newly calculated value match, the receiving host can be confident that the message was delivered intact.

Cryptographic Protocol Overview

Figure 5:
FIG. 5 is a diagram of the packet format, including packet labeling, used on the network.

FIG. 5 shows the preferred protocol headers for host-to-host messages and for control messages. All packets have an Ethernet or Token Ring header, as appropriate, with the standard IPv4 (Internet Protocol version 4) header and an IP Security (IPSec) header extension with an Common IP Security Option (CIPSO) label, as specified by RFCs 1825–1829. Different packet formats, as yet unspecified, will be used for the Type 1 model of the security device 18.

The headers (IP, IPSec, CIPSO label, and cryptographic headers) are in clear text while IP data (i.e., TCP or UDP headers and data) are encrypted. RFC 1851 describes the formatting of encrypted packets. Label integrity uses, but is not limited to, DSS, SHA or MD5. This provides protection of both data and control communications. If tunneling is configured for the association, the host's IP header is encapsulated in the encrypted payload. At the receive end, before the packet is decrypted, MAC processing is based on the CIPSO label and DAC processing is based on the sending host's IP address.

Traffic keys are determined by each pair of communicating security device 18 using Internet Engineering Task Force (IETF) key determination based on shared secret information (IKE) or some other recognized process. The NSC 12 can be used as a Certificate Authority. Traffic keys are derived separately for each security level and host.

Key life is determined centrally, based on elapsed time or number of bytes. The NSC 12 defines the key life when the security device 18 is initialized and the security device 18 initiates its own key change when the key life expires. The security devices 18 transfer traffic keys to the NSC (via key generation audit) for short-term archival and potential key recovery.

Individual host-to-host associations may be protected by an appropriate encryption algorithm, as determined by the administrator. All network control communications are protected by the highest level of encryption available to the system. The network 10 also permits a network administrator to designate certain associations as clear-text (unencrypted). This mode of operation permits a host to communicate with other cleartext hosts.

SECURITY POLICIES

This section describes the Mandatory Access Control (MAC) and Discretionary Access Control (DAC) policies enforced by the security devices 18. It also describes Labeling, Identification and Authentication (I&A), Audit, Object Reuse, and System Architecture as they relate to the policy of the network.

Mandatory Access Control (MAC) Policy

Mandatory access control is implemented through a security window calculation (FIG. 7) at both the sending and receiving hosts. Each message is assigned a level that reflects both its sensitivity (e.g., secret, proprietary) and its handling restrictions (e.g., not releasable to foreign nationals, not releasable to the engineering department). Sensitivity is the combination of a hierarchical level (TopSecret>Secret>Proprietary>SBU>Unclassified) and a non-hierarchical category. Categories may be of the form "X," where X is the name of some project "Corporate Merger" or operation "Desert Storm."

Similarly, for at least single level workstations, each network principal, or authorized user, is assigned a level that reflects the host's trustworthiness to read and properly handle sensitive messages.

Two rules govern the reception and transmission of messages by the host. First, only an authorized host may receive sensitive data over the network. Thus, for instance, a standard PC operating as a host without any added security mechanisms of its own may have a security device configured to operate at Level-Top Secret and Categories=(USNukes, SpySatellites). This configuration would be okay provided that the host is not permitted to transmit any of that onto the network or to receive anything different. Thus, the security window for that host, but not that principal, is closed down so that the host can only SEND TS (USNukes, SpySatellites) and RECEIVE TS (USNukes, SpySatellites).

Second, data that is transmitted is properly labeled so that it will be properly handled by the transmitting host as well as the remote receiving host. If the remote host is also a PC, then its security windows must be closed down to a single point as in the preceding example. The security device ensures that its transmissions are securely labeled. The network security officer is able to determine the specific range of levels, or security window, at which each host is permitted to communicate.

If the remote host is a Mulit-Level Secure computer that is capable of simultaneously processing a range of Secret to Top Secret, then the security window can be opened up accordingly. In this sense, the host is then trusted not to mix up the Secret with the Top Secret.

This flexible design permits unsecured hosts to be quickly and easily added to the network 10. These unsecured hosts can freely inter-operate with other unsecured hosts without any restriction. However, secured network hosts will not inter-operate with these unsecured hosts unless the secured hosts are specifically authorized to network non-sensitive data, that is, via a defined security window.

MAC is concerned with preventing each host from receiving data classified above the host's current level ("read up") and transmitting data classified below the hosts's current level ("write down"). The level of a host computer is expressed as a range of hierarchical clearance levels (e.g., Secret, Top Secret) and sets of non-hierarchical categories (e.g., Project1, Operation2000), as determined by the profiles of individuals that: use the computer. Individual host computers may or may not be trusted to handle MLS data.

Figure 6:
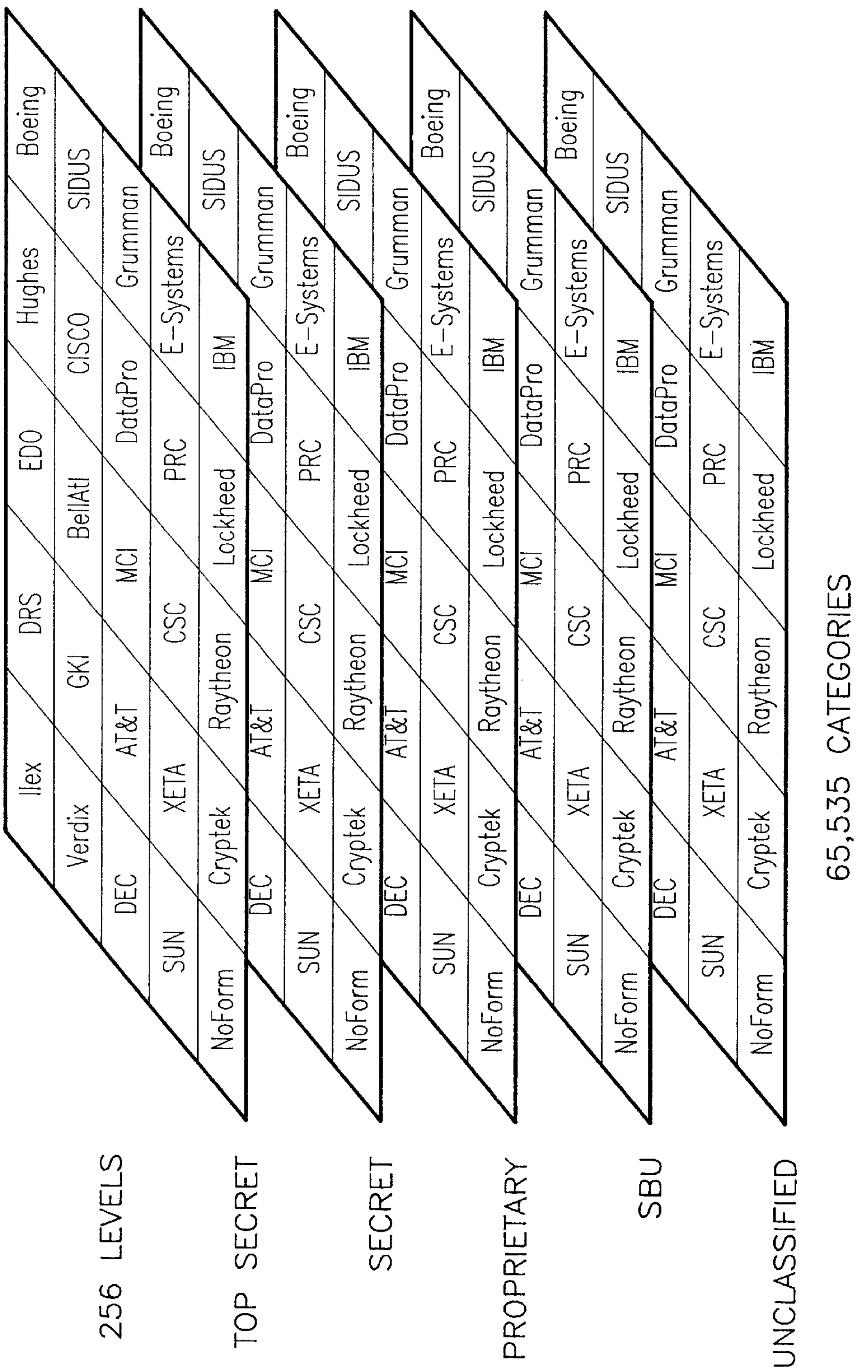
FIG. 6 depicts representative labeling for the hierarchical levels and non-hierarchical categories used by the network.

As shown in FIG. 6, the network 10 is capable of supporting up to 256 hierarchical security levels and at least 65,535 non-hierarchical categories. The security administrator assigns names (e.g., "Unclassified", "Secret") and a hierarchical relationship to the security levels that will be used in the system. Typically, only a few security levels are defined and the rest are unused.

The administrator also assigns names to the non-hierarchical categories, but as the name implies, these can be placed anywhere in the category space. All hosts must use the same labeling conventions on the network, but individual MLS hosts may have different values for a level or category as represented within the operating system.

Referring back to FIG. 4, the network 10 architecture provides an innovative and flexible "security window" mechanism that is capable of supporting both trusted MLS hosts (Region C) and single-level hosts (Region D). For hosts in Region C, the security device 18 can be configured to permit packets labeled at multiple levels, with multiple different sets of categories. There are separate windows for a host's transmissions to the network and the host's receptions from the network. The security window can be closed down to a single authorized level and set of categories, or can be opened up to accommodate multi-level hosts.

Figure 7:
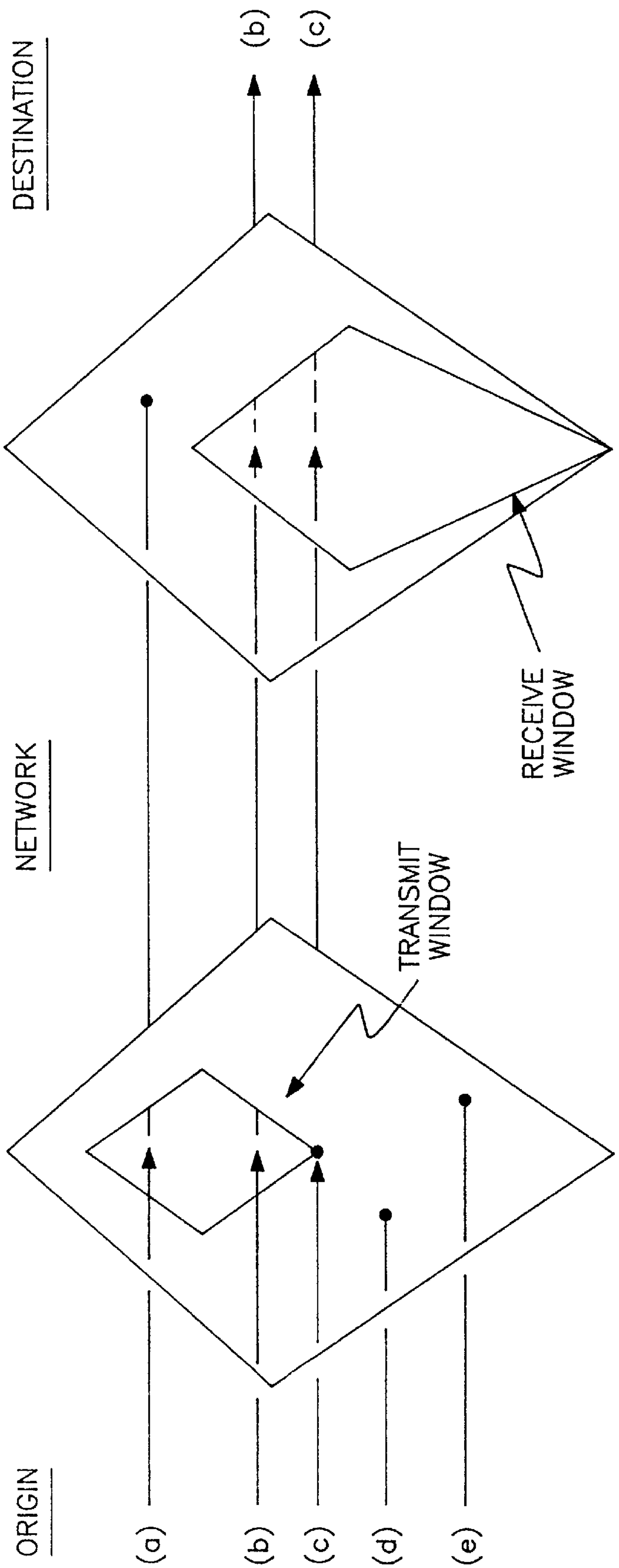
FIG. 7 is a representation of the transmit and receive windows for communication of information between hosts of the network.

As shown in FIG. 7, packets {a, b, c} pass through the origin security device 18 transmit window, while packets {d, e} are labeled below allowable limits (attempts to "write down") and are rejected and audited. For the packets that pass through the sending host's transmit window, the packets are labeled by the sending host and mediated by the sending security device 18. At the destination, only packets {b, c} pass through the receive window while packet {a} is labeled above allowable limits.

As further shown in FIG. 7, in order for data to flow from one host to another, it must satisfy the MAC restrictions enforced by both the sending and receiving security device 18. The diamond shapes in the figure are intended to reflect the lattice organization of a range of security levels and non-hierarchical categories.

More formally, the requirements to transmit data are stated in terms of the dominance relationships. The hierarchical classification in the packet's security label must be greater than or equal to the minimum allowable classification in the host's transmit window. In addition, the packet's security label must be less than or equal to the maximum allowable classification in the host's transmit window.

The non-hierarchical categories in the object's security label include all the categories defined for the lower bound of the host's transmit window and are included in the categories defined for the upper bound of the host's transmit window.

A similar dominance relationship is defined for the receive side of the association. The important point, though, is that the purpose of this is to prevent the sending host from sending data below its actual classification ("write down") and prevent the receiving host from reading data above its authorizations ("read up").

As an example, suppose the labeling space defined for the network includes four hierarchical levels: Unclassified, Confidential, Secret, Top_Secret and Ultra_Secret; and 26 non-hierarchical categories {A, B, C, D, . . . X, Y, Z}. In addition, suppose a B2-evaluated host is operating at a range of levels Secret to Top Secret, with category A required, and categories {D, Z) optional depending on the data processed by the operating system. The security device 18 might be configured to permit any of the labels of Table 1 to be transmitted and received.

TABLE 1

| Level | Categories |
|---|---|
| Secret | A |
| Secret | A, D |
| Secret | A, Z |
| Secret | A, D, Z |
| Top_Secret | A |
| Top_Secret | A, D |
| Top_Secret | A, Z |
| Top_Secret | A, D, Z |

Continuing with our example, the security device 18 may also be configured by the system administrator to reject and audit any of the representative labels shown in Table 2.

TABLE 2

| Level | Categories | Reason |
|---|---|---|
| Secret | A, B | Category B is not permitted |
| Top_Secret | A, D, M, Z | Category M is not permitted |
| Secret | none | Must have Category A |
| Top_Secret | D, Z | Must have Category A |
| Unclassified | A | Security Level too low |
| Ultra_Secret | A, D | Security Level too high |

For hosts in Region D, policy dictates that each host must operate at a single level at a time (otherwise it would be a non-MLS host processing more than one level of information). For these single-level hosts, the security window can be collapsed to a single labeling and all packets sent by the host must match that labeling exactly. For simplicity, however, a different option is permitted below.

Labeling—Single Level Hosts

The MAC implementation described above calls for each host to create a label in each packet, then to pass the packet to the security device 18 where the label is mediated with respect to the security window for that node. For single-level hosts, either the security device 18 can simply stamp the administratively-defined label into the packet header or a simplified driver can read the appropriate information from the security device and label the packets before giving them to the security device.

For single-level hosts, stamping the label into the header is equivalent to mediating the host-defined label against a security window that contains a single acceptable labeling. No mediation is required for these single level hosts because the security device 18 stamps the only label that is acceptable for that node. The two approaches (security window, labeling) are compatible because, in both cases, (1) only packets consistent with the security policy are transferred onto the network, and (2) each packet on the network is labeled at the correct level.

The label can be at any hierarchical level and non-hierarchical category set defined for the network. The labeling information is transferred to/from the NSC 12 to the security device 18 in CIPSO format using the same means used to transfer the security window for multi-level hosts.

This method for stamping a label into the packet header works only for single-level hosts, or for MLS hosts that are administratively constrained to a single level on the network. Hosts that operate in MLS mode on the network must provide a trusted labeling process with the label mediated by the security device 18.

Discretionary Access Control (DAC) Policy

Discretionary access control at layer 3 of the protocol stack is concerned with ensuring that a host computer can only have associations with authorized host computers. DAC is implemented through a pair of association lists, a "receive" association list and a "transmit" association list. Both the receive and transmit association lists are assigned by the network security officer.

Each network host, or authorized user permitted to access an authorized workstation, can only send messages to hosts that appear in its transmit association list. Likewise, a host is only permitted to receive messages from hosts that are named in its receive association list.

The network 10 enforces a centralized discretionary access control (DAC) policy based on hardware addresses, Internet Protocol (IP) addresses and Transmission Control Protocol (TCP) or User Datagram Protocol (UDP) ports. This policy is specified by a network security administrator at the NSC 12 and downloaded to each security device 18 as part of the principal's security profile. The DAC policy is not settable by the individual hosts involved.

The IP portion of the DAC policy addresses the ability of any host in the 32-bit IP address space to send and receive from any other host. This policy is enforced at the transmit side of the network (based on the sending host's authorization to send to the destination address) and at the receive side of the network (based on the receiving host's authorization to receive from the destination address). The DAC policy is independent of the classification level and categories, but cannot override a MAC decision.

In actual use, this may be set up, for instance, as associations between pairs of hosts. For example, a first set of hosts {A, B} may communicate with each other, and a second set of hosts {C, D, E} may also be permitted to communicate with each other. However, communication is not permitted between any of the hosts of the first set with any of the hosts from the second set. These sets of hosts are essential VPNs.

The network 10 also provides rudimentary port filtering based on TCP and UDP ports, with the default being no port-based filtering. TCP and UDP each provide 16-bits of port space, with the ports used to identify specific endpoints (client or server process) on the sending and receiving hosts. Each TCP/UDP header has a source port address and a destination port address, where the source port address is associated with the sending process on the source host, and the destination port address is associated with the intended recipient process on the destination host.

The port filtering rules are also part of the DAC policy, specified by a network security administrator at the NSC 12, downloaded to security devices 18 as they come online, and enforced by the security device 18 for every packet. The port filtering aspect of the policy serves to further restrict communications between pairs of hosts that are authorized to communicate. For example, workstation A may be permitted to access server B, but the security device 18 for server B might block packets to port 23 (to block use of Telnet) or port 514 (to block access to the UNIX syslog facility).

The port filter is preferably per association, so effectively Telnet from a specific host may be permitted, and denied for all other hosts. For instance, if the protocol type does not specify either TCP or UDP, then the packet is passed to IP address filtering. Packets that are rejected because of a host-to-host association or a blocked port may be audited by the NSC.

The network 10 preferably combines the features of both mandatory and discretionary access control. Accordingly, for instance, in order for host A to transmit a message to host B, three conditions must be met: (1) the network requires that principal A's transmit association list must include host B; (2) host B's receive association list must include host A; and, (3) the security level of the message must be included within both host A's and host B's security windows. Requirements (1) and (2) are based upon DAC, and requirement (3) is based upon MAC.

Identification and Authentication (I&A)

I&A is performed at the NSC 12 for operators and administrators and is performed at the security device 18 for the principals that are authorized to operate a node of the secure network. Identification of security officers at the NSC is a conventional login with user ID and password.

The security device 18 boards support various types of I&A for principals, including but not limited to authentication cards (what the user has) and ID/password (what the user knows). The mechanism used by a particular security device 18 board is determined from configuration data read from the administrator's card. The mechanisms include: an authentication card, ID/Password, Fortezza and Authentication card and PIN.

An authentication card is the standard means for I&A, and requires each principal to insert an authentication card in the security device 18 card reader to use the network. Each principal's card is programmed at the NSC and preferably transferred to the principal in person. The card contains one-time password information that prevents spoofing by anyone other than an administrator. This information includes the principal ID and a random value that is updated once per login.

The security device 18 performs I&A via an ID and password entered by the principal at the attached host. The password is compared with the value stored at the NSC. This method requires the local host to provide a trusted path mechanism by which the principal can reliably place the user ID and password in the security device 18. For single-user workstations, this may mean, for instance, that the user of the workstation enter the principal ID and password.

Fortezza involves the use of a Fortezza card in the host system to sign a defined value with the identity of the principal. It also requires a trusted path between the host's Fortezza software and the network driver.

The authentication card and PIN mechanism requires the principal to enter a PIN at the host in addition to inserting the authentication card.

Regardless of the means used for authentication, a principal's ability to use the network depends upon the Security Officer defining the principal in a database at the NSC, and providing the means of authentication (programmed card, password, etc.) to the principal.

Audit

Audit is the second key part of an accountability policy. MLS systems must record information about security-relevant events such as use of I&A mechanisms and attempts to send data outside of the host's security range or on unauthorized connections.

The network 10 provides selectable auditing of the following types of events: login and logout of security officers at the NSC; change of security databases at the NSC; I&A of principals; statistical events, providing detailed information about the individual packets transmitted and received; exception events, including attempts to violate the security window, send to or receive from an unauthorized association, etc.; TCP/UDP port filtering rejections; and, TCP opens and closes.

The NSC provides real-time alarms of attempted security violations. These are typically directed to a printer, and include the date and time, principal identifier, IP addresses, and protocol type and port number. The network immediately notifies the network security officer of any attempted violations. The network optionally disconnects the offending host from the network to avoid additional audit data from being generated.

Object Reuse

Object reuse (OR) is concerned with preventing inadvertent release of residual data, typically, in unused fields or at the end of a packet buffer. The TNI has two requirements for object reuse: preventing access to the residual data itself, and preventing use of residual authorizations. Both object reuse requirements are addressed by the innovative use of specialized hardware on the security device 18 board hardware that sanitizes buffers before they are reused again by the system. This hardware may be thought of as a macro extension of the processor.

System Architecture Requirement

A secure network must have a system architecture that ensures the network functions as a reference monitor. In accordance with the TNI, which defines the Network Reference Monitor (NRM) concept, an NRM must be tamperproof, must always be invoked, and must be small enough to be subject to complete analysis and testing. This relates to the ability of a MLS network to accurately and completely perform the functions that it is supposed to provide.

This requirement is inherently addressed by placing the security enforcement mechanisms in their own dedicated domain on the security device 18 board, where they cannot be interfered with by the host's software. It is supported by the effective use of cryptography to provide communications secrecy and communications integrity for all host-to-host transfers and all control communications.

DESIGN

The secure network described above consists of a specialized NSC 12 host dedicated to configuring and auditing the secure network and a network security device 18 installed between each host computer and the network medium. The design of the NSC 12 and the security device 18 mediation will now be discussed.

Network Security Center or Controller (NSC)

The NSC 12 is a dedicated machine used by the security officer to configure, operate, and audit the operation of the secure network. The NSC is necessary for the network to run, although the security devices 18 may also be configured to continue operating without the NSC.

The NSC is responsible for both authenticating principals when they connect to the network and for authorizing connections. When a principal initially signs onto the network over an authorized security device, the NSC is contacted to verify the authentication data and to initialize security-relevant parameters, including the security profile, the association profiles, and the seed, or keying material, from which the security device generates individual encryption keys.

Once the initialization is complete, the security device possesses sufficient intelligence and autonomy to manage all subsequent communication with other security devices across the network by itself. However, the security device continues to automatically report security-relevant occurrences to the NSC where they are displayed as real-time alarms and added to the audit log where they can later be examined for evidence of potential security violations.

The network architecture preferably provides for up to two separate NSCs, a primary NSC and a hot backup NSC. In normal operation, the primary NSC manages all aspects of the network, and provides automatic updates of network databases to the backup. The address of the backup NSC is known to the various security device adapters (from information read from an installation card), but the backup NSC does not participate in network policy management.

If the primary NSC fails, each security device independently switches over to the hot backup and periodically checks the availability of the primary. The backup preferably allows network principals to authenticate themselves, download configuration data, and begin operating on the network. The backup also logs audit data and provides the ability to configure individual boards to operate in "emergency mode" and generate their own keying material.

The NSC is preferably implemented on a commercial off-the-shelf Pentium-class machine, using Windows NT for screen management, printer management, keyboard/mouse input, threads dispatching, and object reuse. The NSC software is organized as a main application with multiple worker threads for network control, network I/O, audit, print management, and system monitoring.

The NSC does not use any NT networking code. Instead, the NSC uses a security device 18 board with special firmware (known as the security device 18-Prime) that manages the encryption/transmission of control messages to the various security device boards, and the reception/decryption of responses and audit data. The security device 18-Prime manages control keys based on the security device 18 addresses.

The NSC 12 provides at least two levels of Security Officers in accordance with the concept of least privilege: an administrator has access to all NSC commands (configuration, operation, and auditing), while an operator can only perform restricted control and monitoring functions. A security administrator can define additional site-specific roles that permit operators at a particular facility to have additional privileges beyond the pre-defined operator role.

The NSC command set includes security officer, network control, network management, principal, and security device 18 functions. The Security officer commands provide the ability for a security officer to login, logout, acknowledge alarms, and modify the security officer database. Network control functions include starting, stopping, suspending, resuming, and auditing the network.

Network management functions include defining user profiles, including security windows and host-to-host associations. It also includes loading key files, setting date and time, and database functions such as archiving the audit file and backing up and restoring databases.

Principals are the individuals that are directly responsible for the operation of nodes of the secure network. They may be users of single-user workstations, or may be administrators of multi-user systems. The functions related to management of principals include defining, editing, listing, and removing the principal data records, and programming access cards for the principals to bring up a network node.

Security device 18 functions include editing security device 18 data records, shutting down, suspending, and resuming security device 18 operation, and refreshing encryption keys used by the security device 18. Creating an installation card used to installation of the security device boards with their IP address and control keys.

Security Device 18 Architecture

In the preferred embodiment, the security device 18 is at self-contained circuit board that is directly attached into the hardware of the host system. The architecture is straightforward, enabling the device to be readily integrated into a variety of hardware environments. The device operates using its own independent processor 48, bus 46, program and data memory 54. These independent elements isolate the security device, including its algorithms, and insure that it operates within its own protected domain. Providing an independent processor also avoids stealing any memory cycles or processing bandwidth from the host in which it is installed. Since the device operates at a low OSI level, enforcing all security mechanisms within the hardware circuit board, it is tamperproof and cannot be compromised by software-based attacks.

Figure 8:
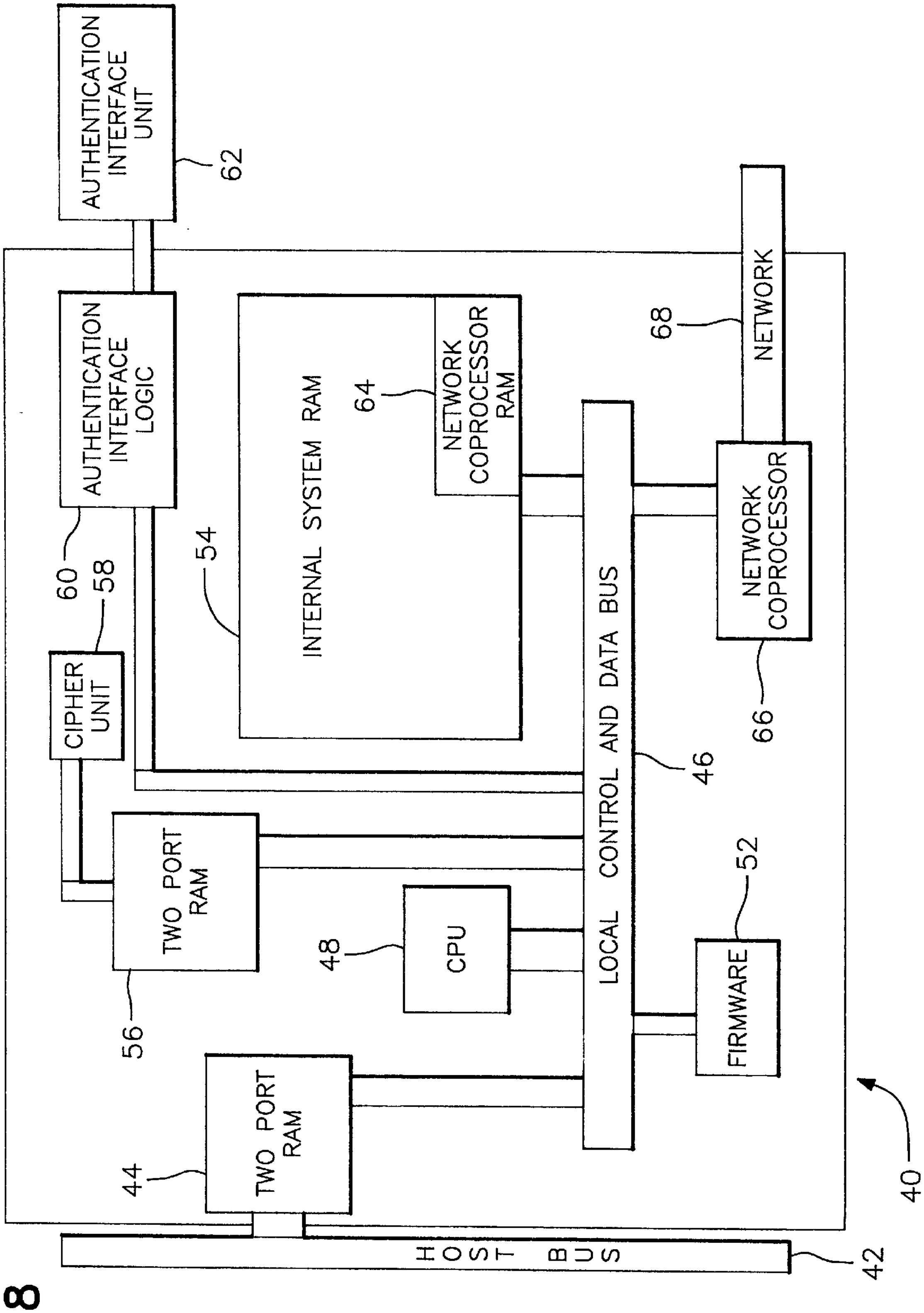
FIG. 8 is a block diagram of the security device.

As shown in FIG. 8, the security device 40 consists of a single-board adaptor installed on a Host Backplane Bus 42. Different implementations exist for various host bus architectures (for instance, PCI, Sbus, and ISA) and various network interfaces (such as Ethernet and Token Ring). Yet, each security device 40 includes a host interface, attached card reader 62, processor block, local RAM 54, cipher block and network block.

The host interface includes the host adapter's bus interface logic (not shown) and a block of two-port RAM 44. Portions of the memory 44 can be mapped into either the host. adapter memory space or the security device's 40 own internal memory, but not both at the same time. The host copies a packet into the two-port RAM 44 buffer and writes a memory location to cause the buffer to be mapped into the security device memory. After the buffer is transferred to the security device, it is invisible to the host processor until it is processed.

The processor block consists of a dedicated processor 48, non-volatile memory 52 (EPROM/flash) for program storage, and support logic. The processor block includes dedicated hardware logic burned into a ROM on the security device board, to move buffers, scrub buffers in support of object reuse requirements, and move data to and from the encryption chip.

The security device has its own internal system RAM 54, which is used for transitory storage of data packets, security windows, association lists, and the like. A portion of the internal RAM 54, identified as network coprocessor RAM 64, is used by the network block to send and receive packet buffering.

The cipher block 58, which consists of encryption device (s), support circuitry, and dedicated memory two-port RAM 56 available only to the processor and encryption hardware. The network block is the network coprocessor 66, which includes logic to send and receive packets on the network 68. The network 68 is preferably a LAN.

A key architectural feature of this hardware design is that the network medium 68 is separated from the host bus 42. This separation of the two interfaces dictates that packets will move from one interface to the other only if moved by security device's 40 software 52. The only way a packet may move from host bus 42 to local bus 46, is for the CPU 48, running the firmware 52, to grab the packet from the two-port RAM 44.

In addition, the hardware design provides a separation of the security device's own processing environment from both the host and the network. The security device's program and internal buffers are invisible to the host because of the dual-ported RAM design. Further, except for control requests from the NSC 12, which are accepted only from the NSC and must be cryptographically verified, there is no interface by which another host on the network can retrieve data from the security device's internal buffers.

Because all communications from one host to another must use the services provided by the security device in order to access the network, it is not possible for a host to inadvertently or maliciously bypass the security device security features. In a properly configured network, where there are no other electrical connections to the network, it is possible to make absolute statements that the host software (whether trusted to operate in MLS mode, or not) must operate in accordance with the centralized network security policy set up by the security policy defined by the security officer at the NSC. Further, any packets that are transmitted are cryptographically protected before being placed on the network.

The security device functions are implemented in firmware 52 installed on the security device board. During installation, the security device firmware reads an administrator installation card at the authentication interface unit 62 to get the board IP addresses (Node, NSC, default router) and cipher key. Subsequently, the security device downloads principal-specific and node-specific data, via the network interface 66, from the NSC and sends audit events to the network for archival. However, the security device operates independently of the attached host.

The security device has four general phases of operation: configuration, initialization, key exchange, and secure communication. Configuration is performed by the network security officer at the NSC workstation. The NSO configures each security device to support one or more principals, where each principal may have up to about 100 profiles. Each profile has associated mandatory access controls (security windows) and discretionary access controls (association lists).

Initialization of the security device occurs when a principal authenticates, via the security device, to the NSC. The security device reads security profile selected by the principal and cryptographic seed keying material from the database resident on the NSC. Whenever the security device establishes initial contact with another host that is also equipped with a security device, key exchange is conducted to prepare for secure communications between the hosts.

After a user is authenticated and selects a valid profile, the security device firmware downloads the security window and association list for the principal from the NSC. The window (that is, the hierarchical security levels and non-hierarchical categories, are represented in CIPSO format.

After configuration, initialization, and key exchange have taken place, secure communication between pairs of hosts is automatically and transparently managed by the respective security devices. User programs executing atop a security device equipped host only require access to a standard built-in networking application program interface (API) such as WinSock or TLI. This interface to the security device disguises the fact that an intricate sequence of operations is being performed by the security device each time a packet is transmitted or received across the network.

The network security claims for the security device 18 depend upon the proper sequence as well as execution of the following tasks. This can be viewed as multiple layers of processing in which the transmit flow of packets involves processing the individual layers from the highest layer (host) to lowest layer (network).

Packets are transmitted from the left to the right, that is, from the host bus 42 to the network 68, and received right to left, from the network 68 to the host 42. Packet flow is controlled by the CPU 48 and its firmware programs 52. Transmission and reception of packets will be discussed in further detail below with reference to FIGS. 9, 10 and 12.

Figure 12:
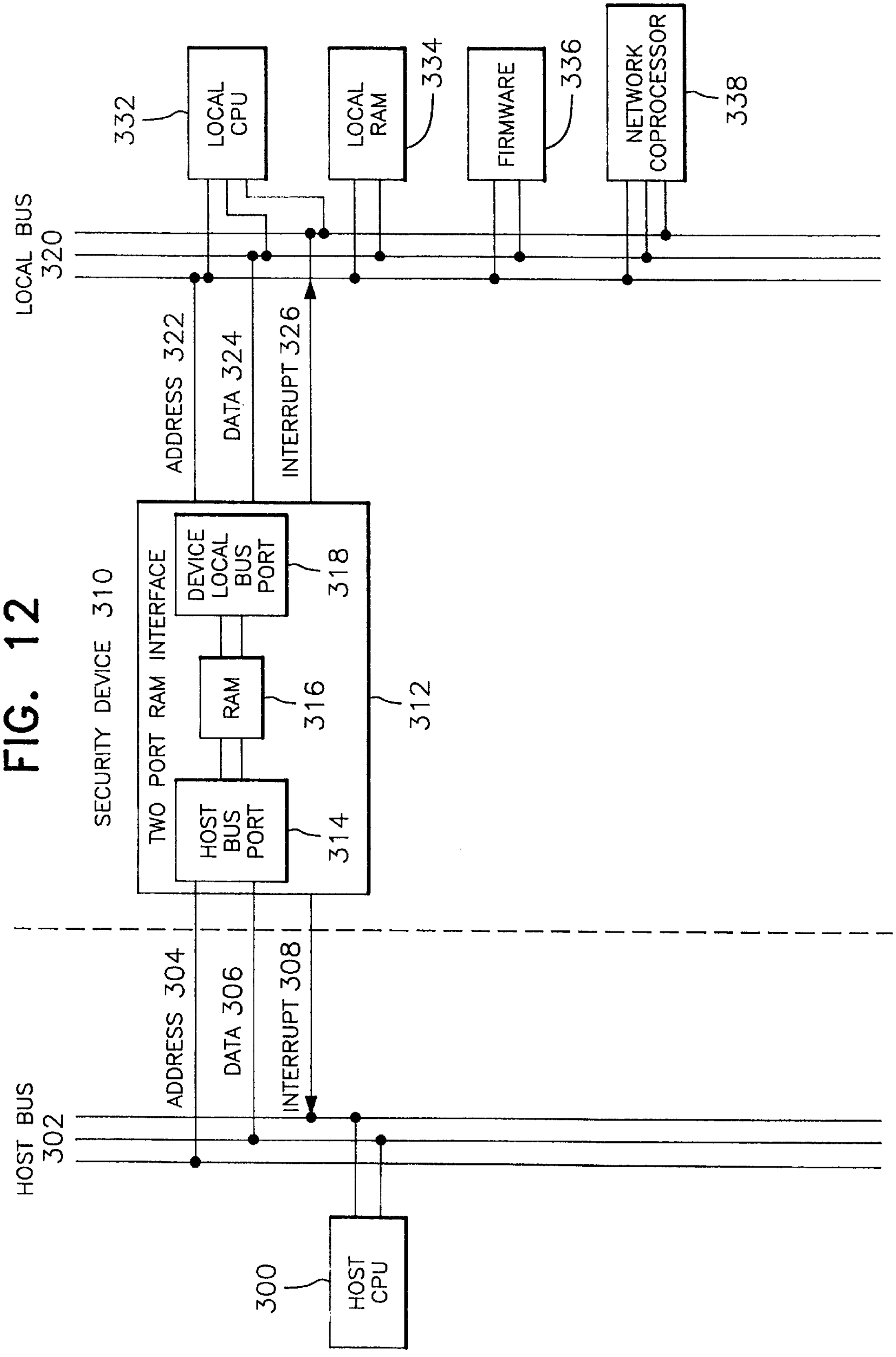
FIG. 12 is a schematic showing the host bust interface using a two-port RAM.

The security device 40 is configured so that malicious programs on the host computer can not directly access any of the devices on the security device local bus 46. Thus, direct access cannot be established to the local RAM 54, network coprocessor 66, encryption hardware 58, or authentication interface 60. This is accomplished by only permitting communications between the host bus 42 and the internal bus 46 via the two-port RAM 44. Thus, the host bus 42 address signals, data signals, read/write signals, and so forth, do not extend to the local bus 46. Instead, each bus 42, 46 essentially terminates at the two-port RAM interface 44. (FIG. 12).

The two-port RAM 44 is connected to the host bus 42 and provides complete separation of the host and internal busses. The two-port RAM 44 is implemented as standard RAM storage devices with, two separate bus interfaces. This design provides for no pass-through or leakage from one bus to the other, except by a write on one bus to a memory cell followed by a read on the other bus.

In operation, a principal inserts a card in the authentication interface unit 62 and selects a profile using the keypad and display on that unit. The unit 62 is typically connected to the interface logic 60 by a ribbon cabling. The logic 60 enables information to be read/write to/from the card, as well as to read the keypad and write to a display.

Once a principal is authenticated, the host may transmit packets to the network. With cross reference to FIG. 9, a host asserts a signal on the bus 42 to put a packet into the two-port RAM 44, step 100. The CPU 48, operating under control of firmware 52, reads the packet from the shared memory 44 by asserting signals on the local bus 46.

The CPU 48, using a transmit association list in the internal memory 54, performs DAC by determining if the destination IP address is in the transmit list, step 102. The transmit list was previously downloaded from the NSC via the network 68, based upon the principal authentication and profile selected. The CPU 48, using a transmit security window in the internal memory 54, performs MAC by determining if the security label is consistent with the transmit security window, step 104. As with the transmit list, the security window was also downloaded from the NSC as a result of the principal authentication and the profile selected.

The CPU 48 then puts the packet in the cipher two-port RAM 56, which is used for communications with the cipher unit 58. The cipher unit 58 uses pre-loaded keying material to perform the cryptographic transformation and place the result back into the two-port RAM 56. Unlike the host two-port RAM, the cipher two-port RAM 56 preferably does not have protection responsibility. Rather, the cipher two-port RAM 56 is used to facilitate communications between the CPU 48 and cipher unit 58, step 106.

Next, the CPU 48 collects information from the packet that is to be protected by a message digest (cryptographic checksum), and places it in the cipher two-port RAM 56. The cipher unit 58 makes the cryptographic transformation and puts it back into the cipher two-port RAM, where the CPU takes it and puts it in the IP header, step 107.

The CPU 48 then puts the packet into a reserved area in the network coprocessor RAM 64. The network coprocessor 66 takes the packet from this RAM 64 and transmits it onto the network 68, steps 108, 110. RAM 64 is a portion of the internal RAM 54 that is dedicated by the firmware 52 for use by the network coprocessor.

Figure 10:
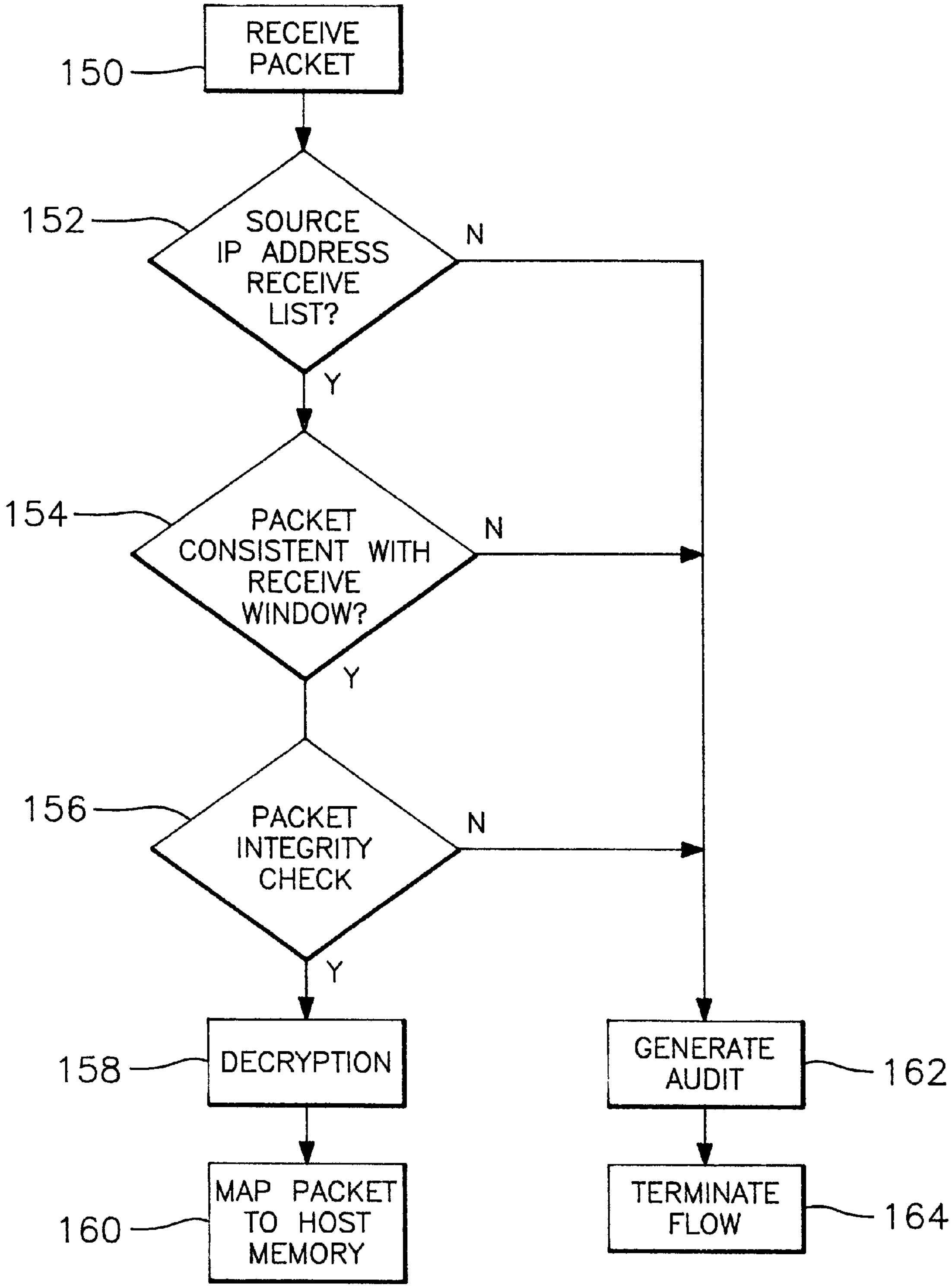
FIG. 10 is a flow diagram showing the IP packet reception for the security device.

Packet reception operates in the reverse manner, as discussed with relation to FIG. 10. After the packet is received from the network 68 by the network coprocessor 66 and placed in the network coprocessor RAM 64, the CPU 48 takes over and does reception DAC, step 152 and MAC, step 154 using data structures in internal RAM 54 that were downloaded from the NSC after principal authentication and profile selection.

The CPU 48 verifies the integrity of the packet, step 156, by performing the same message digest calculation done by the sending host in step 107. If the results match, then the packet was not modified en route. This involves putting data in cipher two-port RAM 56 and the cipher unit 58 performing a transformation using keys loaded in the hardware. The CPU 48 decrypts the packet, step 158, using the same general approach flow of processing as for encryption, step 106, but with the cipher unit operating in decryption mode.

Figure 9:
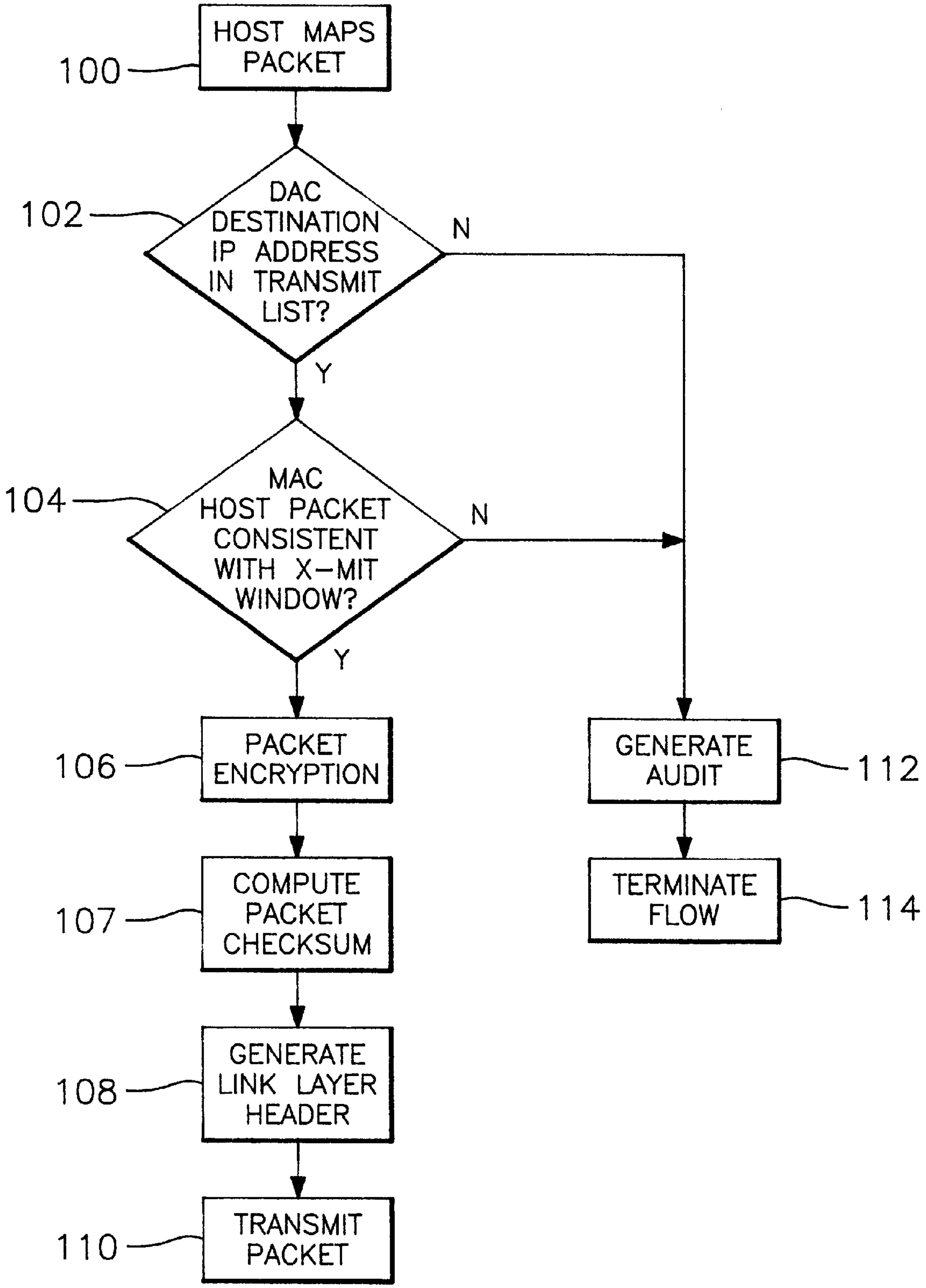
FIG. 9 is a flow diagram showing the IP packet transmission for the security device.

FIG. 9 shows the process for transmitting information. At step 100, the host requests and the security device 18 maps the packet to be transmitted. At this step, the host places a packet in the Interface Control Block (ICB) and notifies the security device. This maps the packet out of host memory and into board memory.

At the security device, the packet then undergoes DAC, step 102. Here, the security device verifies that the host has an authorized transmit association to the destination address in the host's IP header. If not, an audit is generated, step 112, and the processing flow is terminated, step 114.

If the destination address is in the transmit list, Mandatory Access Control is performed. At step 104, the security device verifies that the host-specified packet label (CIPSO) is consistent with the transmit security window, or (for single-level hosts) labels the packet with the host label. If not, an audit is generated, step 112, and the processing flow is terminated, step 114.

At step 106, for packets satisfying both discretionary and mandatory access control, the packet is encrypted, using the encryption key for the destination IP address. At step 107, the cryptographic checksum B is computed and placed in to the packet. Proceeding to step 108, the link layer header is generated, and at step 110, the packet is transmitted.

Similarly, packet reception occurs in an order of processing, from the lowest layer to the highest. Turning to step 150 of FIG. 10, the security device receives the packet from the network. Discretionary Access Control is then performed by security device by verifying that the host has a receive association for the source IP address in the incoming packet's IP header, step 152. If not, an audit is generated, step 162, and the processing flow is terminated, step 164.

Mandatory Access Control is performed at step 154 by verifying that the packet label (CIPSO) is consistent with the receive security window. At step 154, the security device verifies the integrity of the received packet by calculating a message digest (cryptographic checksum) of the received data. If the computed value matches the value sent by the originating security device, then the packet was not modified. If not, an audit is generated, step 162, and the processing flow is terminated, step 164.

For packets satisfying both discretionary and mandatory access control, the packet is decrypted, step 156, using traffic key for source IP address. The security device then maps the packet out of the board memory and into the host memory.

When configured at installation (by data on the administrator's card), the security device 18 provides the ability for the attached host computer to initiate switching from one authorized profile to another. Each profile has associated with it separate transmit and receive security windows for MAC, as well as separate transmit and receive association association lists for DAC.

The host enters the profile by using its trusted path to write the new profile identifier into the security device ICB. The security device validates that the host actually has the requested profile and, if so, then resets the security window and associations and sends a profile change notification to the NSC. If the security device is not configured to allow the host to initiate profile switching, then principal must select another profile via the card reader in order to switch profiles.

The security device also provides a way for the local host to place cleartext data in the ICB and receive the encrypted results. This uses the standard packet transmission code with a specified key.

Host Bus Interface Using Two-Port RAM

Figure 11:
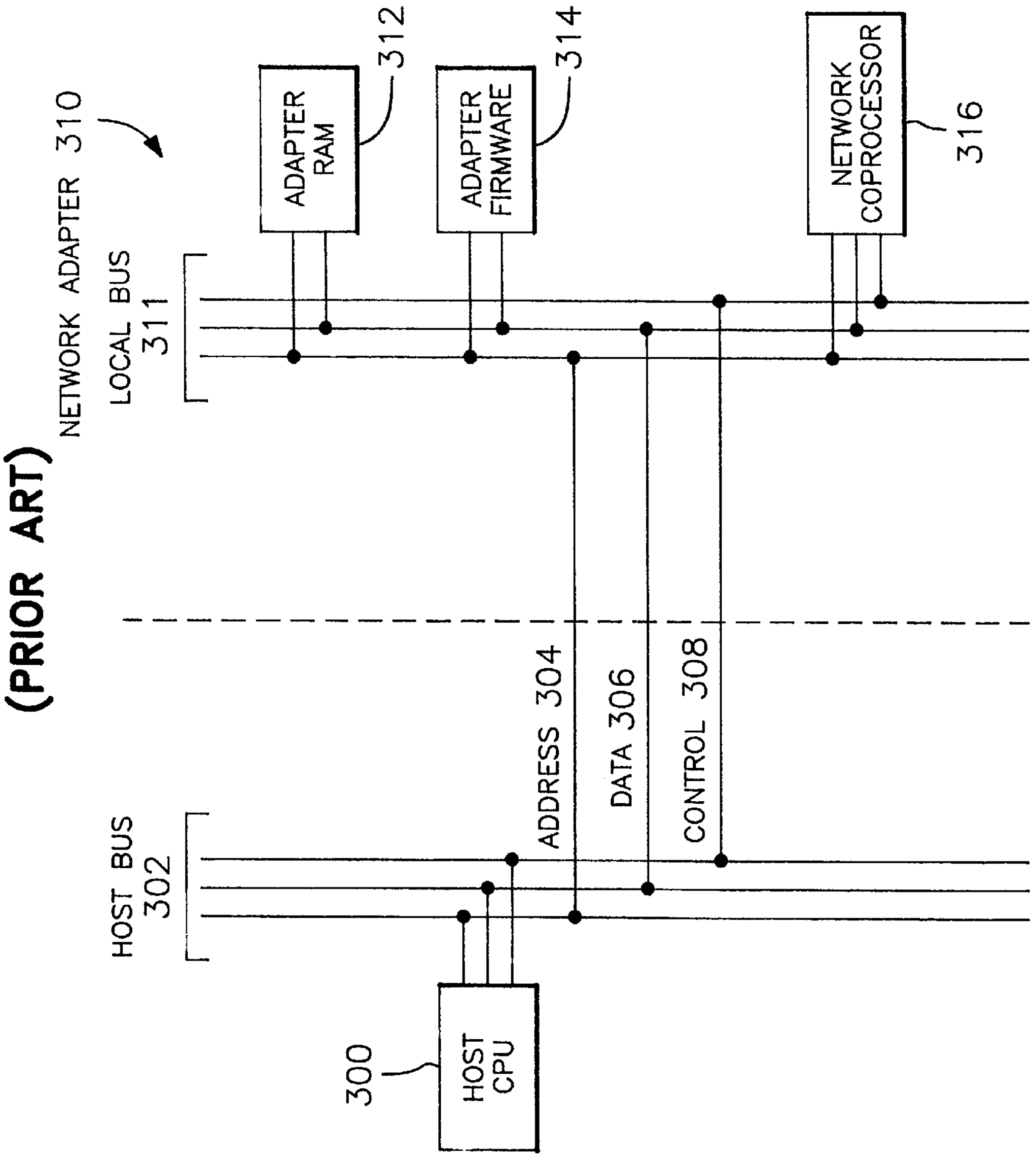
FIG. 11 is a schematic showing conventional network adapter architecture.

In order to better understand the operation of the host bus interface, which uses two-port RAM 44, reference will first be made to the conventional network adapter architecture. A standard network adapter 310 is shown in FIG. 11. The same general architecture is used for other types of adapters, e.g., SCSI controllers, video controllers, etc.

Typically the adapter is plugged into the host bus 302, which typically consists of address lines 304, data lines 306, and control lines 308. For example, on a 32-bit computer, there might be 32 address lines, 32 data lines, and several control lines (interrupt, I/O, etc.). In a standard network adapter, some portion of these lines extend directly into the adapter card 310. For example, the local bus 311 might consist of 8 address lines, 8 data lines, and a few control lines. These are wired directly or with minimal interface logic to the host bus 302.

If the adapter has local RAM 312 or local adapter firmware 314, these are directly accessible to software (typically a device driver) on the host computer. This means is commonly used for personal computers to execute extensions to the device driver that are resident in firmware on the adapter board. In the case of a network adapter, a network coprocessor sits on the bus and sends receives packets from adapter RAM 312 or from host memory (not shown).

The problem with this architecture for a security device, however, is that the contents of memory on the adapter board depend on the trustworthiness of the host operating system. Any user process on the host 300 that can bypass these host controls can modify memory locations on the adapter board and cause the network adapter to send or receive anything.

Turning to FIG. 12, the host bus interface having a two-port RAM is shown in further detail. The security device 310 runs in its own protected domain, completely isolated from potentially malicious host software running on the host CPU 300. This is done via a two-port RAM interface 312 implemented on the security device 310, and providing only a limited means for the host software to interact with the security device.

In particular, it is not possible for host software to observe or modify data in the local RAM 334, firmware 336, or network coprocessor 338. This is because the only signal lines that extend from the host bus onto the security device are those address and data lines used to read and write data into the host port 314 of the two port RAM 312. There is no path onto the local bus 320.

The operation of the two-port RAM interface for packet transmission will now be discussed. The host 300 device driver builds a packet for transmission and writes the packet into a portion of the two port RAM. However, the exact memory layout of the two-port RAM is irrelevant to the security provided by the system, and other suitable configurations may be used.

The host 300 device driver writes to a memory location in the two-port RAM that causes an interrupt 326 to be signaled to the CPU 332 of the security device.

The firmware 336 of the security device contains code to map the portion of two port RAM 312 out of host memory and into the security device's memory. When this occurs, the memory is no longer visible to the host (typically, a bus error occurs if it is accessed) and is visible to the security devices firmware. Thus, when the transmit buffer is mapped out of host memory, a new buffer is mapped into host memory. Therefore the host always has a buffer to which he has access. The device will not map the buffer out of host space until it can process the buffer.

Next, the firmware 336 accesses the data by memory reads using the local address 322 and data 324 lines to the two port RAM. The packet is moved from the two port RAM area into local RAM space via a hardware assisted block move mechanism. The firmware 336 running on the local CPU 332 then performs MAC, DAC, encryption and integrity functions, and may hand the packet to the network coprocessor 338 for transmission. All of this is invisible to software running on the host CPU 300.

The operation for packet reception is similar. The network coprocessor 338 receives a packet, places it in local RAM, and the firmware 336 on the local CPU performs MAC, DAC, decryption, and packet integrity functions. If the packet is valid for the host, the firmware 336 places the packet in the two port RAM via memory writes using the address 322 and data 324 lines. Again, this goes into an available portion of the two port RAM using conventions established by the security device and the host device driver.

When the packet is fully placed into this memory, the firmware maps the memory buffer into host memory (thus making it visible to the host device driver) and writes a memory location that causes the two port RAM interface circuitry to assert an interrupt signal 308 to the host CPU.

The key points of this interface are: (1) host signal lines do not extend into the security device board, and so the only means for the host to interact with the security device is via this two port RAM interface. (2) A particular buffer in the two port RAM is invisible to the host while the security device is processing its contents.

The CPU of the security device has access to all memory on the NIC board at all times, even when a particular buffer in the two port RAM is mapped into host memory. However, when the buffer is mapped into the security device's address space, the host computer has no access to the buffer.

General Operation

Figure 13:
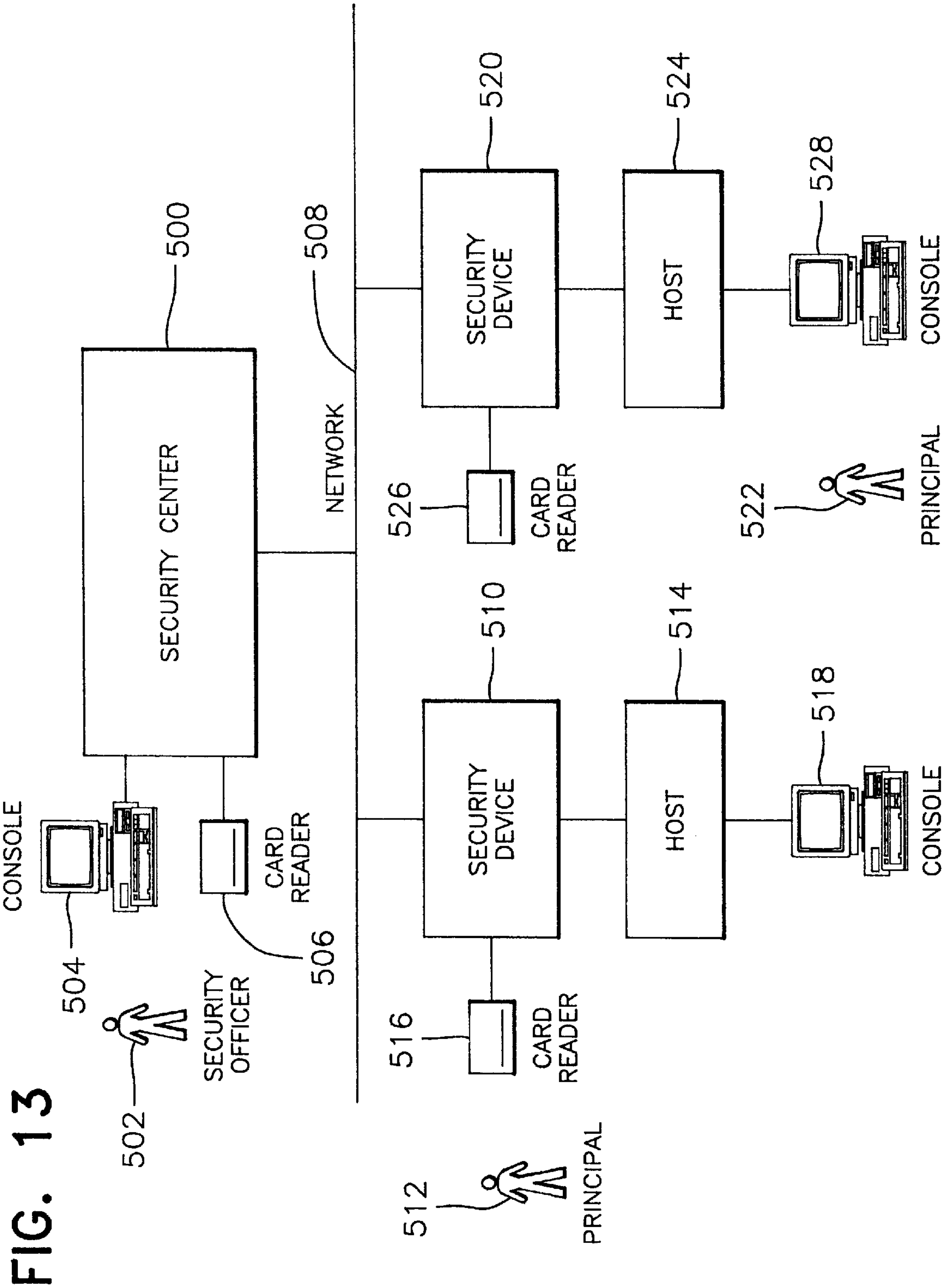
FIG. 13 is a block diagram showing the overall structure of the network.

The overall operation of the system will now be discussed with reference to FIG. 13. The first step is to configure the network. A security officer 502 at the network security center 500 interacts via menus at the security center console 504 to define security devices (510, 520), principals (512, 522), classification levels, etc. This includes profiles for principals, which includes associations such as the ability of host 514 to transmit to host 524.

The security officer 502 also specifies the authentication method (card, password, etc.) to be used by the principal. If the principals are to use an authentication card, the security officer creates individual authentication cards at the card reader 506 and gives these cards to principals (512, 522). During this process, the security officer 502 creates an initialization card for security devices (510, 520) and physically goes to that site to read in the card via card readers (516, 526) in order to complete installation of the devices.

Each principal goes to the location of the security device (510, 520) and initiates the authentication method specified for the principal. Different principals may be configured to use different means, for example, principal 512 may be configured to use an authentication card and principal 522 may be configured to use a password.

When an authentication card is required, the principal 512 inserts the authentication card into the card reader 516, which is connected to the security device 510. The card is read by the security device 510. Principal 522, which has a password instead of a card, types the password at the console of host 528. The host transfers the password to the security device 524 via a trusted path.

The device will be defined to support a specified authentication type. The principal who is attempting to use the device must have the appropriate authentication data. The security devices independently transfer the authentication data to the security center 500 via an encrypted (nominally Triple DES, although other methods are conceivable) connection. The security center replies to the security device, listing the profiles that may be selected by the principal. This may be anywhere from a single profile up to a hundred profiles.

Each principal (independently) selects the desired profile at the keypad of the local card reader (516, 526). Each security device (510, 520) sends this information to the security center 500 via an encryption connection.

There is not an initial communication without the selected profile between the device and the controller. The device gathers the required data and then sends all of the information via the encrypted channel to the controller. The security center responds to the security device with the security windows to be used for MAC and the security associations to be used for DAC. Assuming that security devices (510, 520) permit associations between hosts (518, 528), the security devices negotiate traffic keys between the two devices (based on a shared secret value downloaded from the security center). The shared secret is only one of the possible mechanisms. The approved mechanisms are defined in the IPSec standards.

At this point the two hosts (518, 528) may communicate via their respective security devices, provided that communications are consistent with the predefined security windows (MAC).

Example Embodiment

Figure 14:
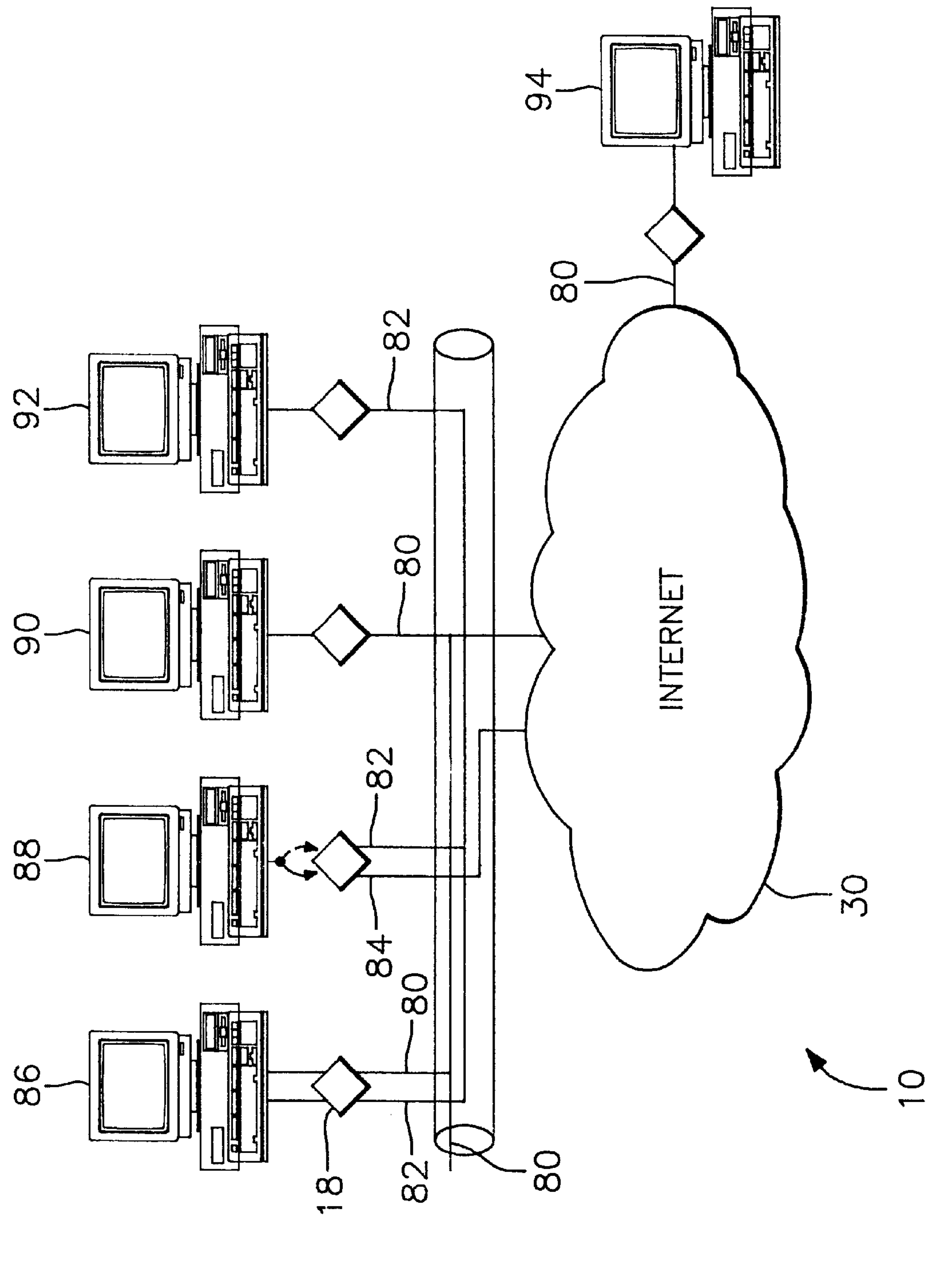
FIG. 14 is an example of how the security device can be used to partition a network (including the Internet) into multiple trusted Virtual Private Networks (VPNs), with the ability to switch a host between VPNs.

Turning to FIG. 14, an example of a local area network 10 is shown connected to a network 30. The LAN 10 comprises a first VPN 80, and a second VPN 82. The VPNs 80, 82, are established by a security officer that sets up permitted associations between hosts based on IP addresses. The VPNs are collections of host IP addresses that are permitted to communicate. Hosts on the second VPN 82 are invisible to hosts which are not directly addressable. This centralized configuration of secure VPNs is enforced by the respective security devices 18 of each host.

In the example set forth in FIG. 14, working from the left of the page, a first host 86 is configured to operate on both the first and second VPNs 80, 82. The third and fourth hosts, 90, 92, only have the ability to operate on either the first VPN 80 or the second VPN 82, respectively, but cannot access both VPNs. This is merely a matter of defining the IP associations permitted for this host.

The second host 88 has a security device 18 that permits the host 88 to operate either on the second VPN 82 or on an untrusted line 84. This ability to switch between a trusted network 82 and an untrusted network 84 is defined by the security officer at the NSC by defining multiple permitted profiles for a principal. When the principal authenticates at the security device 18 associated with this host 88, the principal determines which of the permitted profiles is to be used.

According to our example, the profile for the principal operating at the second host 88 is twofold. First, for the second, VPN 82, the host 88 is permitted to transmit and receive associations with the first host 86 and with the fourth host 92. A security window for MAC is also defined. A security window is always used, except when the security device is operating in a bypass mode to unprotected hosts, such as hosts without a security device. Secondly, when operating on network 84, the second host 88 is permitted to communicate with any unprotected host (not shown) anywhere on the Internet.

Although the principal at host 88 may switch between the second trusted VPN 82, and an untrusted path 84, the principal may only use one profile at a time. Thus, the host 88 may connect to either the untrusted network 84 or the trusted network 82 to communicate only with hosts 86, 92. Thus, it is impossible for a host on the Internet to route packets through hosts 88 and back out on the trusted network 82, perhaps to attack the fourth host 92.

If the principal has a profile that permits communication with unprotected hosts (such as hosts that do not have a security device 18), the security device operates in a "bypass" mode. In the "bypass" mode, the security device does not provide encryption but does implement MAC and DAC. Thus, MAC and DAC are always performed, though encryption may not be performed depending on the destination node.

Further to this example, if the second host 88 is an untrusted host and it is operating at a secret level, then the memory of the second host 88 before permitting connections to or from any other untrusted host. This is possible, for instance, by switching disk drives, such as a slide-in drive, and power-cycling the host to clear memory.

Unlike the second host 88, the third host 90 is configured (by the user's profile) to be able to connect over the Internet 30 to a remote host 94, as well as to the first host 86 via line 80. Simultaneously, the first host 86 may be connected to the fourth host 92 via line 82.

Alternative Embodiments

The preferred embodiment is for networks including multi-user servers, where the principal is not necessarily a user of the attached host. However, the invention may be used in any suitable network environment, such as one having single-user workstations where the principal is the current user of the workstation. The security devices in the single-user workstation network may be configured so that the classification of the host is related to the administrative clearance of the user/principal operating at the host. The network would support multi-level security for communications between individual users.

Although the preferred embodiment is also for a network having classified information, the invention has uses for unclassified environments as well. As implemented in an unclassified network, for instance, instead of establishing different hierarchical security levels, various non-hierarchical descriptors may be defined by the network security officer. Also, a combination of levels and descriptors may be defined.

In the present embodiment, for example, the security device may be used to monitor and distribute incoming and outgoing information in accordance with the various descriptors. Principals are assigned profiles that define permitted associations and the like. Each principal may be assigned one or more profiles. The principal may log in at any host and select from the one or more profiles. The selected user profile is then used to define the permitted communications for that host. Accordingly, a principal may use any host to connect to the network, and select a user profile to establish the parameters for that connection.

In yet another alternative embodiment, the security device 18 may be eliminated altogether and the security mechanisms implemented by software located at the computer (or as otherwise suitable). Thus, for instance, the software is configured to is implement encryption, DAC and MAC for all incoming and outgoing communications. In addition, the software establishes and implements user profiles, association lists, and audit events, as defined by the network security officer.

The foregoing descriptions and drawings should be considered as illustrative only of the principles of the invention. The invention may be configured in a variety of manners and is not limited by the design of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A security device for connecting a host computer from a host bus to a network accessible to other host computers, the security device comprising a local bus, a network interface connecting said local bus to the network, and a two-port memory device connecting said local bus to the host bus including a first port coupled to said host bus, a second port coupled to said local bus, and a RAM connected between said first and second ports, said RAM storing information provided over said host bus in a host bus memory space and storing information provided over said local bus in a local bus memory space wherein information to be transferred from the host bus to the local bus is written to said host bus memory space and then transferred out of host bus memory space into local bus memory space in advance of security processing, said transferred information being invisible to said host bus, said security device further comprising a central processing unit connected with said local bus, said central processing unit having associated firmware, and a security device local RAM, said central processing unit transferring information out of said local bus memory space of said two-port memory device into said security device local RAM in accordance with a predetermined security policy.

2. The security device of claim 1, further comprising a cipher unit connected to the local bus.

3. The security device of claim 1, further comprising an authentication interface unit connected with said local bus for authenticating a computer user.

4. The security device of claim 1, wherein said network interface comprises a network coprocessor.

5. The security device of claim 1, wherein the network comprises a local area, Ethernet or token ring network.

6. The security device of claim 1, wherein security is implemented at a network layer of protocol hierarchy.

7. A security device for connecting a host computer from a host bus to a computer-accessible network, the security device comprising a local bus, a network interface for connecting said local bus to the computer network, and a communication separation unit for connection between said local bus and said host bus, said communication separation unit including a first port coupled to said host bus, a second port coupled to said local bus, and a signal storage device interconnecting said first and second ports, said signal storage device storing signals provided over said host bus in a host bus memory space and over said local bus in a local bus memory space, wherein said signals are switchable between said host bus memory space and said local bus memory space with said switched signals from said host bus memory space being invisible to said host bus after being switched to said local bus memory space, said communication separation unit preventing pass-through of signals between said host bus and said computer-accessible network without transitory storage in said signal storage device, said security device further comprising security device processing means and a local RAM, said security device processing means for transferring signals between said local bus memory space of said signal storage device and said local RAM.

8. The security device of claim 7 wherein said signal storage device includes a RAM.

9. The security device of claim 7 wherein said signal storage device is a two-port RAM.

10. The security device of claim 7 wherein said security device processing means enables the writing of signals over said host bus to said signal storage device and the reading of signals from said signal storage device to said local bus.

11. The security device of claim 7 wherein said network interface includes a network processor.

12. The security device of claim 7 wherein signals to be passed between said host bus and said local bus are switched out of host bus memory address space into local bus memory space.

13. The security device of claim 12 wherein said switching is in advance of security processing.

14. The security device of claim 7, further comprising an authentication interface unit connected with said local bus for authenticating a computer user.

15. The security device of claim 7 further comprising a cipher unit connected with said local bus.

16. The security device of claim 15 wherein said cipher unit is connected with said local bus via a RAM.

17. A security device for a multi-level secure network implementing security at a network layer (layer 3) of protocol hierarchy having a plurality of host computers accessible to users and connected to a computer network medium, said security device connectable between at least one host computer bus and the network medium, wherein said security device comprises a local bus, a network interface for connecting said local bus to the computer network medium, and a communication separation means for connection between said local bus and said host bus and for preventing direct pass-through of signals between said host bus and said local bus, said communication separation means including a memory device for storing information provided over said host bus in a memory space, and means for switching said information from said memory space to said local bus while making said switched information inaccessible to said host bus.

18. The security device of claim 1 wherein said network interface comprises a network processor for extracting information out of said security device local RAM for transfer to said network.

19. A security device for a multi-level secure network implementing security at a network layer (layer 3) of protocol hierarchy having a plurality of host computers accessible to users and connected to a computer network medium, said security device connectable between at least one host computer bus and the network medium, said security device comprising a local bus, a local RAM, and a local processor;

a network interface for connecting said local bus to the computer network medium and including a network processing means for transferring information between said local RAM and said network medium;

a communication separation means for connection between said local bus and said host bus and for preventing direct pass-through of information between said host bus and said local bus and for preventing direct access between said host bus and components within said security device, said communication separation means including a memory device for storing information provided over said host bus in a memory space, a first port interconnecting said host bus and said memory device, and a second port interconnecting said local bus and said memory device, said information transferrable from said memory space to said local bus while making the transferred information inaccessible to said host bus;

wherein said local processor processes information to be transferred between said host bus and said network medium in accordance with a predetermined security policy to determine whether communication between a host computer and the network medium is authorized, said local processor including means for accessing host bus information from said memory space of said communication separation means, processing said host bus information in accordance with said security policy, transferring the processed host bus information to said local RAM for access by said network processing means, accessing network medium information placed in said local RAM by said network processing means, processing said network medium information in accordance with said security policy, and transferring the processed network medium information to said communication separation means for access by said host bus.

20. The security device of claim 19 further comprising authentication means for reading authentication information from an authentication unit to determine an individual's having access to the network, said authentication means connected with said local bus.

21. The security device of claim 19 further comprising encryption/decryption means for encrypting host bus information and for decrypting network medium information.

22. The security device of claim 19 wherein said processing of said host bus information in accordance with said security policy includes means for performing discretionary access control (DAC) and mandatory access control (MAC) policies.

* * * * *